US012609342B2

(12) United States Patent
Kreysern et al.

(10) Patent No.: US 12,609,342 B2
(45) Date of Patent: Apr. 21, 2026

(54) CELL STACKING SYSTEM FOR STACKING SEGMENTS OF ENERGY CELLS, METHOD FOR CONTROLLING SUCH A CELL STACKING SYSTEM, SUB-DEVICE OF A CELL STACKING SYSTEM OR IN A CELL STACKING SYSTEM, AND SUB-METHOD FOR PRODUCING CELL STACKS IN A CELL STACKING SYSTEM

(71) Applicant: KÖRBER TECHNOLOGIES GMBH, Hamburg (DE)

(72) Inventors: Jan Kreysern, Hamburg (DE); Karsten Meinke, Mölln (DE); Dirk Zeuner, Schwarzenbek (DE)

(73) Assignee: KÖRBER TECHNOLOGIES GMBH, Hamburg (DE)

( * ) Notice: Subject to any disclaimer, the term of this patent is extended or adjusted under 35 U.S.C. 154(b) by 0 days.

(21) Appl. No.: 18/842,877

(22) PCT Filed: Mar. 7, 2023

(86) PCT No.: PCT/EP2023/055739
§ 371 (c)(1),
(2) Date: Aug. 30, 2024

(87) PCT Pub. No.: WO2023/170060
PCT Pub. Date: Sep. 14, 2023

(65) Prior Publication Data
US 2025/0183348 A1 Jun. 5, 2025

(30) Foreign Application Priority Data
Mar. 8, 2022 (DE) .......................... 102022105397.0

(51) Int. Cl.
*B65H 29/24* (2006.01)
*H01M 10/04* (2006.01)

(52) U.S. Cl.
CPC ...... *H01M 10/0404* (2013.01); *B65H 29/241* (2013.01); *B65H 2406/345* (2013.01)

(58) Field of Classification Search
CPC .................... B65H 29/40; B65H 31/32; B65H 2301/42124; B65H 33/16; B65H 31/10;
(Continued)

(56) References Cited

U.S. PATENT DOCUMENTS 4,514,128 A * 4/1985 Hedrick ................. B65H 33/08
271/189
4,521,008 A * 6/1985 Granzow ............... B65H 29/58
271/9.03
(Continued)

FOREIGN PATENT DOCUMENTS

DE 43 00 002 A1 7/1993
DE 44 37 722 A1 4/1996
(Continued)

OTHER PUBLICATIONS

Examination Report issued by the German Patent Office dated Jan. 4, 2023 with respect to the German priority application No. 10 2022 105 397.0.

*Primary Examiner* — Gregory W Adams
(74) *Attorney, Agent, or Firm* — SALIWANCHIK, LLOYD & EISENSCHENK

(57) ABSTRACT

The invention relates to a cell stacking system for stacking segments of energy cells, comprising—a feed device which continuously feeds the segments at a feed speed, —a discharge device which discharges the segments in stacks, and—at least one cell stacking apparatus which receives the segments from the feed device and transfers the segments to the discharge device in a stacked manner, wherein—the cell stacking apparatus has at least one removal apparatus and a depositing element, and—the depositing element has a transfer device, a depositing lever, and a receptacle which
(Continued)

can be moved from a receiving position into a dispensing position and vice versa, wherein—the depositing lever removes the segments from the removal apparatus and transfers the segments into the receptacle arranged in the receiving position and—the transfer device can be moved from a ready position into a holding position, wherein—the transfer device is arranged in the holding position during the movement of the receptacle from the receiving position into the dispensing position and forms a intermediate support for depositing the segments.

28 Claims, 8 Drawing Sheets

(58) Field of Classification Search
CPC ........... B65H 29/241; B65H 2406/345; B65H 2301/426; B65G 57/03; B65G 57/14; H01M 10/0404
See application file for complete search history.

(56) References Cited

U.S. PATENT DOCUMENTS

| | | | | |
|---|---|---|---|---|
| 4,638,993 | A * | 1/1987 | Granzow | B65H 29/40 |
| | | | | 902/15 |
| 4,714,394 | A * | 12/1987 | Ehlscheid | B65H 31/32 |
| | | | | 414/793.1 |
| 4,997,338 | A * | 3/1991 | Couturier | B65H 33/02 |
| | | | | 414/790.8 |
| 5,088,720 | A * | 2/1992 | Beeman | B65H 33/02 |
| | | | | 271/189 |
| 5,346,206 | A | 9/1994 | Steinhart | |
| 5,494,400 | A | 2/1996 | Mendoza et al. | |
| 5,894,937 | A | 4/1999 | Schmidt | |
| 6,022,443 | A | 2/2000 | Rajala et al. | |
| 7,364,398 | B2 * | 4/2008 | Michler | B65H 31/32 |
| | | | | 414/798.2 |
| 7,470,102 | B2 * | 12/2008 | Gendron | B65H 31/3045 |
| | | | | 414/796 |
| 7,624,983 | B2 * | 12/2009 | Hausler | B65H 31/32 |
| | | | | 271/314 |
| 8,100,253 | B2 * | 1/2012 | Walsh | A61F 13/15764 |
| | | | | 198/377.08 |
| 9,237,970 | B2 * | 1/2016 | Iida | B65H 35/00 |
| 2004/0124068 | A1 * | 7/2004 | Berndtsson | G06K 19/07716 |
| | | | | 198/608 |
| 2020/0044273 | A1 | 2/2020 | Abe | |
| 2021/0202976 | A1 | 7/2021 | Abe | |
| 2022/0069412 | A1 | 3/2022 | Masada et al. | |

FOREIGN PATENT DOCUMENTS

| | | |
|---|---|---|
| DE | 10 2017 216 213 A1 | 3/2019 |
| WO | WO 2016/041713 A1 | 3/2016 |
| WO | WO 2020/017155 A1 | 1/2020 |

* cited by examiner

CELL STACKING SYSTEM FOR STACKING SEGMENTS OF ENERGY CELLS, METHOD FOR CONTROLLING SUCH A CELL STACKING SYSTEM, SUB-DEVICE OF A CELL STACKING SYSTEM OR IN A CELL STACKING SYSTEM, AND SUB-METHOD FOR PRODUCING CELL STACKS IN A CELL STACKING SYSTEM

CROSS REFERENCE TO RELATED APPLICATIONS

This application is a National Stage Application of International Application Number PCT/EP2023/055739, filed Mar. 7, 2023; which claims priority to German Patent Application No. 10 2022 105 397.0, filed Mar. 8, 2022.

FIELD OF THE INVENTION

Background of the Invention

The present invention relates to a cell stacking system and a method for controlling such a cell stacking system, a sub-apparatus of or in a cell stacking system and a sub-method for producing cell stacks in a cell stacking system.

Energy cells or energy storage devices within the meaning of the invention are used, for example, in motor vehicles, other land vehicles, ships, aircraft or also in stationary systems such as photovoltaic systems, in the form of battery cells or fuel cells in which very large amounts of energy have to be stored over longer periods of time. For this purpose, such energy cells have a structure consisting of a plurality of segments stacked to form a stack. These segments are alternating anode sheets and cathode sheets, which are separated from each other by separator sheets that are also manufactured as segments. The segments are pre-cut in the production process and then placed on top of each other in the predetermined sequence to form the stacks and joined together by lamination. The anode sheets and cathode sheets are first cut from a continuous web and then placed individually at intervals on a continuous web of separator material. This subsequently formed "two-ply" continuous web made of the separator material with the anode sheets or cathode sheets placed on top is then cut into segments again in a second step by means of a cutting apparatus, wherein the segments in this case are formed in a double layer by a separator sheet with an anode sheet or cathode sheet arranged on top. If this is technically feasible or necessary from a manufacturing perspective, the continuous webs of separator material with the anode sheets and cathode sheets placed on top of each other can also be placed on top of each other before cutting, so that a continuous web is formed with a first endless layer of separator material with anode sheets or cathode sheets placed thereon and a second endless layer of separator material with anode sheets or cathode sheets placed thereon. This "four-ply" continuous web is then cut into segments by means of a cutting apparatus, which segments are in this case formed in four layers with a first separator sheet, an anode sheet, a second separator sheet and a cathode sheet lying thereon. Alternatively, the segments may also be formed from a first separator sheet, a cathode sheet, a second separator sheet and an anode sheet lying thereon. The advantage of this solution is that one cut can be saved. Segments within the meaning of this invention are therefore single-ply segments of a separator material, anode material or cathode material, two-ply or four-ply segments of the structure described above.

Apparatuses for producing battery cells are known, for example, from WO 2016/041713 A1 and DE 10 2017 216 213 A1.

The production of battery cells, for example for electro-mobility, takes place nowadays in production lines with an output of 100 to 240 monocells per minute. These operate in sub-regions or continuously with clocked discontinuous movements, such as back-and-forth movements, and are therefore limited in terms of production output. The majority of known machines operate using the single-sheet stacking method (e.g. "pick and place") with the disadvantage of slower processing. Laminating cell formations is not possible here.

Another well-known approach involves a machine with continuously running material webs and clocked tools, such as cutting blades or tools for adjusting divisions.

In principle, machines with clocked movements are limited in terms of performance. The parts with mass, such as receptacles and tools, must be constantly accelerated and decelerated. The processes determine the timing, and a great deal of energy is consumed. The mass of the moving parts cannot be reduced arbitrarily. Faster moving parts often have to endure higher loads and therefore become more complex and heavier.

In order to reduce the production costs of battery manufacturing, the production speed of the machines must be increased, among other things. A prerequisite for high production output is a high production rate of the stacks of energy cells, which are formed from a plurality of segments of the type described above and which are stacked on top of each other.

In a preceding manufacturing step, the segments are placed on top of each other to form the so-called monocells consisting of a first separator sheet, an anode sheet arranged thereon, a second separator sheet arranged thereon, and a cathode sheet arranged thereon. Alternatively, the separator sheets can initially be guided as two continuous webs, wherein the already cut segments in the form of the anode sheets are placed on one of the continuous webs, and the already cut segments in the form of the cathode sheets are placed on the other continuous web and joined together by a lamination process. The composite sheets thus prefabricated are then bonded together in a further lamination process to form a four-ply composite web. In principle, it is also possible to place the first cut electrode in the form of the cathode or anode between the separator sheets in the form of the continuous webs and to place the second cut electrode in the form of the anode or cathode on or under one of the separator sheets. The four-ply web is then laminated in a joint lamination process so that the monocell is produced in a fixed formation while there are still continuous webs, i.e. before cutting. The monocells are then cut from the composite web by cutting through the distances between the successive anode sheets or cathode sheets. Alternatively, the continuous webs of separator material with the anode sheets and cathode sheets arranged thereon can also be cut, wherein the monocells are then produced by means of a downstream bonding process of a first cut separator sheet with an anode to a second cut separator sheet with a cathode.

The segments are then stacked on top of each other to form a stack of a plurality of segments. If the segments are monocells or separator sheets with anode or cathode sheets arranged thereon, a cathode or anode will be located on a free side surface of the stack, which is then covered by the arrangement of what is known as a closing cell. The closing cell comprises a first separator sheet, an anode or cathode sheet arranged thereon and a second separator sheet arranged thereon, but on which no cathode or anode sheet is arranged. This means that the closing cell can also be regarded as a monocell without a cathode or anode sheet. The finished stack formed from the plurality of monocells and the closing cell is then characterized in that it has a separator sheet in each case on its top side and on its underside, and the anode sheets and cathode sheets are thus each covered by separator sheets on the top side and on the underside and are not in contact with each other.

In order to achieve very high production rates of the energy cells or energy storage devices, it is desirable to stack the manufactured segments with the highest possible positional accuracy at the highest possible production rate.

BRIEF SUMMARY OF THE INVENTION

Against this background, the invention is based on the object of providing a cell stacking system, a method for operating such a cell stacking system, a sub-apparatus and a sub-method which should enable stacking of the segments at the highest possible production rate without this having a detrimental effect on the positional accuracy of the segments stacked relative to one another.

To achieve the object, a cell stacking system and a method for controlling a cell stacking system are proposed. Moreover, to achieve the object, a sub-apparatus and a sub-method are proposed. Further preferred embodiments of the invention can be found in the dependent claims, the figures, and the associated description.

DETAILED DESCRIPTION

To achieve the object, a cell stacking system for stacking segments of energy cells is provided, with:
- a feed device which continuously feeds the segments at a feed speed, and
- a discharge device which discharges the segments in stacks, and
- at least one cell stacking apparatus which receives the segments from the feed device and transfers the segments to the discharge device in a stacked manner, wherein it is proposed that
- the cell stacking apparatus has at least one removal apparatus and one depositing element, and
- the depositing element comprises a transfer device, a depositing lever and a receiving area which can be moved from a receiving position into a dispensing position and vice versa, wherein
- the depositing lever removes the segments from the removal apparatus and places them in the receptacle arranged in the receiving position, and
- the transfer device can be moved from a ready position into a holding position, wherein
- the transfer device is arranged in the holding position when the receptacle is being moved from the receiving position into the dispensing position and forms an intermediate support for deposition of the segments.

The advantage of the proposed solution is that the segments are taken over by the removal apparatus at the feed speed of the feed device and are then received by the depositing element with the depositing lever in a gentle transfer movement, stacked and passed on to the discharge device. In this case, the reduced transverse forces acting on the segments when they are being received by the depositing lever are of particular importance, as this allows the segments to be stacked in the depositing element with greater positional accuracy. It is further proposed that the depositing element has a transfer device which can be moved from a ready position into a holding position and which is arranged in the holding position during the travel of the receptacle for transporting the stacks away and forms an intermediate support for depositing the segments. The transfer device provided makes it possible for the segments to be deposited even if the receptacle filled with the previously completed stack is moved from the removal apparatus to a dispensing location for transferring the stack and is therefore not available for receiving the segments in the transfer position of the removal apparatus. This makes possible an uninterrupted, i.e. continuous, dispensing of the segments from the removal apparatus to the depositing element at a high stacking rate. To ensure that the segments are only deposited on the transfer device when the receptacle is not in the transfer position of the removal apparatus, the transfer device is moved from the holding position back into the ready position as soon as the receptacle has been moved back to the transfer point of the removal apparatus. This means that the stacking process and in particular the movement of the receptacle from the transfer position is not disturbed or restricted by the transfer device. The transfer device is then moved from the ready position into the holding position when a predetermined number of segments are stacked in the receptacle or when a predetermined stack height is reached, namely immediately after the last segment has been placed on the stack. The transfer device is moved into the deposition path of the segments so that the deposition of the next segment on the stack is interrupted, and the next segment is deposited on the transfer device instead. The transfer device effectively thus briefly receives the function of the receptacle by forming an intermediate support until the receptacle is moved back to the transfer point.

It is further proposed that the removal apparatus be formed by a rotatably driven cylinder. The implementation of the removal apparatus as a rotatably driven cylinder has the advantage of a very high receiving speed of the segments from the removal apparatus in a continuous feed movement. In addition, the use of the rotatably driven cylinder has the advantage of a very compact design of the cell stacking system. In addition, a cylinder run can be used as a feed device, which makes it possible for the segments to be supplied at a very high feed rate.

It is further proposed that the cylinder has at least one, preferably three, receiving dogs arranged at identical angles to one another for receiving the segments, from which the depositing lever removes the segments. The receiving dogs allow the segments to be transported and transferred very gently. If several receiving dogs are provided, the receiving rate of the segments by the cylinder can be increased, or conversely the required rotation speed of the cylinder can be reduced for a prespecified number of segments to be received per unit of time.

According to a further preferred embodiment, it is proposed that the number of receiving dogs be uneven. As a result, the receiving position of the segments from the feed device and the transfer position to the depositing element can be arranged opposite one another, i.e. at an angle of 180 degrees in relation to the axis of rotation of the cylinder, and there will always be one receiving dog in the receiving position without another receiving dog being arranged in the receiving position and vice versa. The proposed further embodiment allows the receiving position and the transfer position to be arranged opposite one another, which makes possible a structurally simple structure of the cell stacking system without two receiving dogs passing through the receiving point and the transfer point at the same time.

It is further proposed that the receiving dogs each have a receiving surface in the form of a circular arc section in the cross section of the cylinder, and that the receiving surfaces of the receiving dogs are arranged on the same diameter in the cross section. The receiving surfaces of the receiving dogs thus form a receiving radius and pass through the receiving point and transfer point on an identical diameter in relation to the cylinder.

It is further proposed that the removal apparatus be periodically decelerated and accelerated during the feeding of the segments. By accelerating and decelerating the removal apparatus, the segments can be taken over from the feed device and transferred to the depositing element at different speeds. The segments are preferably received at a high speed in order to achieve a high conveying capacity of the feed device and transfer at a lower speed in order to make the transfer smoother and, in particular, to enable the segments to be stacked with positional accuracy.

It is further proposed that the depositing element has a linearly movable receptacle which feeds the stacks in the direction of the surface normal of the segments of the discharge device. Due to the receptacle which can be moved linearly in the proposed direction, the stacks or the segments stacked therein are transported away without any transverse forces acting on them. This prevents the segments or stacks from losing their positionally accurate arrangement while being transported away.

It is further proposed that the depositing element has a lifting device which, when activated, moves the receptacle via a linear guidance device. The linear guidance device and the associated lifting device transport the receptacle and the stack held therein away along a predetermined travel path, and after the stack has been dispensed the receptacle can be brought back to the transfer point of the removal apparatus in a movement that is to be controlled very precisely.

In this case, it is further proposed that at least one sensor device be provided in the region of the lifting device, which detects a property of the stack or of the receptacle. The travel path of the receptacle realized by the lifting device can thereby be used additionally for the arrangement of a sensor device, whereby the guidance device precisely defines the travel path of the receptacle and enables a precise alignment of the sensor device in relation to the receptacle moving past it with the stack held therein. The sensor device can detect, for example, the position of the receptacle or the passing of a predetermined position by the receptacle. In addition, properties of the stack such as the stack height, the side surfaces of the stack or even the arrangement and alignment of the stack can also be detected so that these can be documented or non-conforming stacks can be outwardly transferred before further processing.

It is further proposed that after a segment has been deposited, the lifting device moves the receptacle away from the removal apparatus by a distance which corresponds to the thickness of the deposited segment plus a prespecified additional distance. Firstly, this ensures that there is sufficient free space between the front face of the stack and the removal apparatus for the next segment to be deposited. This allows the next segment to be deposited without any compressive force being applied to the segment. In addition, the receptacle is moved by a prespecified additional distance so that the necessary free space is created in each case, also taking into account manufacturing tolerances of the segment or tolerances in the movement sequence. In addition, the additional distance created adds up to an increased free space via the number of segments deposited, which free space then enables or simplifies the insertion of the transfer device after the predetermined stack height in the receptacle has been reached.

It is further proposed that the receptacle and the transfer device each have a support surface which is formed by the surfaces of a plurality of fins arranged parallel and equidistant from one another, and that the transfer device and the receptacle engage with one another with their fins during their movements for transferring the stacks of segments. Due to the proposed design of the support surfaces, the receptacle can be moved back to the transfer point after the stack has been handed over without thereby colliding with the transfer device. When moving into the transfer point, the receptacle is moved with the fins of its support surface between the fins of the support surface of the transfer device and thus supplements the support surface of the transfer device to form an enlarged support surface. After the receptacle has been returned to the transfer point, the transfer device is moved from the holding position back into the ready position and transfers the already stacked segments to the receptacle. The stack is in a manner of speaking "transferred".

It is further proposed that a discharge device be provided with a plurality of individually movable transport receptacles into which the depositing element deposits the stacks. The individually movable transport receptacles are used to transport the stacks away for further processing. Since the segments and the stacks are checked for compliance with predetermined quality criteria by means of one or more sensor devices during the preceding transport and/or stacking process and are outwardly transferred from the production process if the quality criteria are not met, the stacking processes and the frequency of the stacks to be transported away can vary. This change in the transport frequency of the stacks to be transported away can be taken into account by the individual mobility of the transport receptacles in conjunction with a corresponding control system.

It is further proposed that the removal device and/or the receptacle of the depositing element have one or more vacuum lines which can be subjected to negative pressure and which, by the application of negative pressure, support the takeover of the segments from the feed device by the removal apparatus and/or from the removal device by the depositing element as well as the transportation on the removal apparatus. Due to the vacuum lines to which negative pressure can be applied, the transfer of the segments and the transportation of the segments on the removal apparatus can be achieved with very low forces acting on the segments. In addition, the forces exerted on the segments can be easily controlled by switching the negative pressure in the vacuum lines on and off. For example, the reception of the segments from the feed device by the removal apparatus can thus be controlled very easily by switching on the negative pressure in the vacuum lines of the removal apparatus and switching off the negative pressure in the vacuum lines of the feed device at a transfer point. The transfer of the segments from the removal apparatus to the depositing element is then carried out analogously by switching off the negative pressure in the vacuum lines of the removal apparatus and switching on the negative pressure in the vacuum lines of the receptacle of the depositing element.

It is further proposed that the depositing lever is driven by a drive device to perform a periodic discharge movement from the removal apparatus. By periodically driving the depositing lever, the segments can be removed from the removal apparatus and stacked into the receptacle of the depositing element in a repeating sequence of movement of the depositing lever.

In addition, a particularly gentle reception and stacking of the segments can be achieved by the discharge movement of the depositing lever being formed by a linear lifting movement. The movement of the depositing lever is directed in such a way that the segments are discharged in the direction of their surface normal or in the radial direction of a removal apparatus formed by a cylinder, since thereby no transverse forces will act on the segments. The lifting movement of the depositing lever can be realized by an eccentric drive, a linear drive or similar.

It is further proposed that during the deposition of the segments in the receptacle, the depositing lever executes a constant stroke or a stroke increasing by a prespecified additional distance. The identical stroke simplifies the movement sequence of the depositing lever. If a detrimental influence of the stack height on the deposition process is to be avoided, this can be effected by controlling the stroke of the receptacle as described above. Alternatively, the depositing lever can also perform a stroke increasing by a prespecified additional distance from the deposition of one segment to the deposition of the next segment. As a result, the stroke of the depositing lever is adapted to the stroke of the receptacle which executes a stroke corresponding to the thickness of a segment plus the path of an additional distance. The depositing lever thus follows the receptacle and the increase in the distance of the surface of the stack at the previous deposition point due to the movement of the receptacle can be at least partially compensated for by the additional distance. Ideally, the additional distance of the receptacle and the additional distance of the stroke of the depositing lever are the same, so that the deposition point of the segments at the surface of the stack is always the same. The deposition point is selected in such a way relative to the surface of the stack that the segments only make a minimal falling movement, ideally no falling movement at all. This allows the forces acting on the segments to be further reduced. In addition, this allows possible relative movements between the segments to be reduced to the smallest possible level, which in turn can in general reduce abrasive wear and the release of particles from the segments.

It is further proposed that, during deposition of the segments on the transfer device arranged in the holding position, the depositing lever executes a stroke which decreases by at least the thickness of the segments. The proposed decreasing stroke makes it possible to avoid a compressive force from being exerted on the segment to be deposited next on the transfer device, without the need for the transfer device to perform a movement. This is particularly advantageous because the transfer device is already specifically designed for the movement sequence from the ready position into the holding position and vice versa by means of a suitable mechanism and a suitable drive, so that the movement of the transfer device in a pure lifting movement in the direction of the segments to be deposited represents a completely new movement, which can only be realized, if at all, with a great deal of effort in addition to the actual movement. If the movement sequence of the transfer device from the ready position into the holding position or vice versa were to be used to compensate for the stack height, unless the movement is a pure lifting movement, it will not be possible to stack the segments in a block with vertical sides with accurate positioning. For this reason, it is preferred that the transfer device does not move during the deposition of the segments and that the compensation of the stack height in this case is realized by changing the stroke of the depositing lever.

In addition, to achieve the object, a method is provided for controlling a cell stacking system for stacking segments of energy cells comprising:

a feed device which continuously feeds the segments at a feed speed, and at least one cell stacking apparatus which takes over the segments (16) from the feed device and stacks them on top of each other into stacks, wherein the cell stacking apparatus has at least one removal apparatus and one depositing element, and the depositing element comprises a transfer device, a depositing lever and a receiving area which can be moved from a receiving position into a dispensing position and vice versa, wherein the depositing lever removes the segments from the removal apparatus and places them in the receptacle arranged in the receiving position, and the transfer device is moved from a ready position into a holding position while the receptacle is being moved from the receiving position into the dispensing position and vice versa, and in the holding position forms an intermediate support for deposition of the segments.

The advantage of the proposed method is that the segments are taken over by the removal apparatus in a continuous feed at the feed speed of the feed device and are then transferred and stacked as gently as possible by the proposed design of the depositing element having the depositing lever, the transfer device and the movable receptacle. Due to the proposed control system, the cell stacking system forms an interface between the continuous feeding of the segments via the feed device and the stacking of the segments, which takes place at a lower or ideally with no transverse speed of the segments, i.e. without an additional transportation speed.

It is further proposed that the removal apparatus have a controllable drive device which is controlled in such a way that the removal apparatus is accelerated for receiving the segments from the feed device and is decelerated for transferring the segments to the depositing element. By means of the proposed control of the drive movement of the removal apparatus, the removal apparatus can be very easily designed to receive the segments at the high feed speed of the feed device and at the same time to transfer the segments to the depositing element as gently as possible.

It is further proposed that the removal apparatus be formed by a cylinder driven by the drive device to perform a rotational movement, and that the drive device controls the rotational movement of the cylinder in such a way that the cylinder takes over the segments from the feed device in a rotational movement and transfers them to the depositing element when at a standstill or in a decelerated rotational movement. Due to the proposed embodiment, the removal apparatus can be specially designed to receive the segments from a feed device formed by a cylinder run, which in turn enables high transportation capacities while at the same time gently transporting the segments.

It is further proposed that the depositing element have a linearly movable receptacle, and that the linearly movable receptacle be moved from a receiving position into a dispensing position when a sensor device detects that a predetermined stack height of the stack in the receptacle has been reached. The receptacle is used to transport the finished stack from the receiving position into the dispensing position and is moved linearly to ensure that the forces acting on the segments are as low as possible. The receptacle is preferably moved linearly in the direction of the surface normal of the segments stacked in the receptacle, so that the lowest possible transverse forces act on the segments when they are being transported away via the receptacle. This linear travel path of the receptacle represents an inventive concept that is independent of the transfer device, by means of which the stacking process and transportation away can also be improved independently of the transfer device.

It is preferred that, after a segment has been deposited, the lifting device moves the receptacle away from the removal apparatus by a distance which corresponds to the thickness of the deposited segment plus a prespecified additional distance. As regards the resulting advantages, reference is made to the description above.

It is further proposed that the transfer device be moved from a ready position to a holding position before the movable receptacle is moved from the receiving position into the dispensing position. The movement of the transfer device and of the receptacle overlap in this phase, so that the transfer device forms a support area for subsequent segments before the receptacle is moved from the receiving position into the dispensing position.

It is further proposed that the transfer device be moved from the holding position into the ready position after the movable receptacle has been moved from the dispensing position into the receiving position. The movement of the transfer device and of the receptacle overlap in this phase as well, so that the transfer device is not moved back into the ready position until the receptacle is in the receiving position and can receive subsequent segments.

It is further proposed that the movement of the transfer device be controlled depending on the movement and/or position of the receptacle. This can prevent a collision between the transfer device and the receptacle during their movement sequences. In addition, the overlapping movement can be controlled particularly easily by not activating the movement of the transfer device into the ready position or the movement of the receptacle into the dispensing position until the other part in question has completed the previous movement process. To ensure the most effective interaction possible between the receptacle and the transfer device, the movements of the receptacle and of the transfer device are preferably controlled in relation to each other in such a way that at least the receptacle or the transfer device is always arranged in the receiving position and forms a support area for the segments to be deposited. This makes possible an uninterrupted deposition of the segments.

It is further proposed that the receptacle and the transfer device each have a support surface which is formed by the surfaces of a plurality of fins arranged parallel to and equidistant from one another, and that the transfer device and the receptacle engage with one another with their fins during their movements for transferring the stacks of segments. The proposed further embodiment makes it possible for the receptacle to be moved very easily into the receiving position while the transfer device is still in the holding position in that the receptacle is inserted with its fins between the fins of the transfer device without colliding with it.

It is further proposed that the depositing lever is driven by a drive device to perform a periodic discharge movement from the removal apparatus. Due to the periodic discharge movement, the segments can be discharged from the removal apparatus one after the other in an identical discharge movement. The periodic discharge movement is preferably a linear lifting movement with the lowest possible transverse forces acting on the segments.

It is further proposed that the discharge movement be formed by a linear lifting movement. The proposed embodiment makes it possible for the segments to be deposited in the receptacle with the lowest possible compressive forces acting on the segments. The lifting movement can, for example, be very easily realized by a controllable eccentric drive with a variable stroke or by a controllable linear drive device.

It is further proposed that during the deposition of the segments in the receptacle, the depositing lever executes an identical stroke or a stroke increasing by a prespecified additional distance.

It is further proposed that during deposition of the segments on the transfer device arranged in the holding position, the depositing lever be driven to a lifting movement with a stroke that decreases in the sequence of the segments by at least the thickness of the segments.

The proposed method features of the movements of the depositing lever during the deposition of the segments on the transfer device and in the receptacle make possible a particularly gentle deposition of the segments. The transfer device remains stationary while the segments are being deposited and forms a stable support surface. The stack is thus built up while the distance between the stack surface and the depositing lever reduces. To ensure that the deposition point of the segments is always the same and as close as possible to the surface of the stack, the depositing lever executes a stroke during this deposition that decreases from the deposition of one segment to the deposition of the next segment, whereby the stroke is ideally reduced by the thickness of one segment. During the deposition of the segments in the receptacle, the stroke can be constant, provided the receptacle carries out a lifting movement with a stroke increasing by the thickness of a segment after a segment has been deposited. However, it is preferred that after a segment has been deposited the receptacle performs a stroke corresponding to the thickness of a segment plus a prespecified additional distance. As a result, after the predetermined number of segments has been completely stacked, the receptacle is moved away from the depositing lever or from the removal apparatus by a distance corresponding to the number of segments multiplied by the additional distance, so that a free space is formed into which the transfer device can immediately move without the receptacle needing to carry out any further movement. To ensure that the deposition point of the segments is not increased by the additional distance during this lifting movement of the receptacle, the depositing lever also carries out a lifting movement with a stroke that increases by an additional distance, whereby the additional distance of the depositing lever and of the receptacle are ideally the same.

In addition, to achieve the object, a sub-apparatus of or in a cell stacking system for segments of energy cells is proposed, wherein:

the feed device is designed and arranged to feed segments of energy cells in a number A per unit of time, a first conveyor unit for segments is provided, which is arranged downstream of the feed device, a second conveyor unit for segments is provided, which is arranged downstream of the first conveyor unit, wherein the first conveyor unit is designed and arranged to receive the number A per unit of time of the segments from the feed device and to transport a number B per unit of time of the segments to a first dispensing region and a number C per unit of time of the segments to a second dispensing region, wherein the number B per unit of time of the segments is provided
so as to be transportable in the direction of the second
conveyor unit and transferable to the second conveyor
unit in the dispensing region, and wherein the number C per unit of time of the segments in the
second dispensing region is provided so as to be
transportable, in particular, to a cell stacking device, or
to a cell stacking apparatus, or to one or more removal
apparatuses of a cell stacking device, and in particular, the sum of the number B of segments per
unit of time and the number C of segments per unit of
time is less than or equal to the number A of segments
per unit of time.

In addition, to achieve the object, a sub-method for
producing cell stacks in a cell stacking system for segments
of energy cells is proposed, in which:

by means of the feed device, which is designed and
arranged to feed segments of energy cells in a number
A per unit of time, a number A of segments is supplied
per unit of time, a first conveyor unit for segments is provided, which is
arranged downstream of the feed device and conveys
segments, a second conveyor unit for segments is provided, which is
arranged downstream of the first conveyor unit and
conveys segments, wherein the first conveyor unit receives the number A per unit of
time of the segments from the feed device and trans-
ports a number B per unit of time of the segments to a
first dispensing region and a number C per unit of time
of the segments to a second dispensing region G2,
whereby the number B per unit of time of the segments is trans-
ported in the direction of the second conveyor unit and
in the first dispensing area is transferred to the second
conveyor unit, and wherein the number C per unit of time of the segments in the
second dispensing region is transferred, in particular to
a cell stacking device, or to a cell stacking apparatus, or
to one or more removal apparatuses of a cell stacking
device and in particular the sum of the number B of segments per unit of time and
the number C of segments per unit of time is less than
or equal to the number A of segments per unit of time.

Both the sub-apparatus and the sub-method comprise two
conveyor units and a division of the supplied segments into
two partial streams. If the capacity of the system is to be
increased or the number of segments transported in the
partial streams is to be reduced, according to the same
principle additional conveyor units arranged parallel to or in
series with the first two conveyor units can be provided.

It is further proposed that the second conveyor unit is
operated as a rotationally drivable conveyor unit, in particu-
lar in the form of a transfer cylinder or as an operatively
connected combination of a first rotationally drivable con-
veyor unit, in particular in the form of a reversing cylinder,
and a second rotationally drivable conveyor unit, in particu-
lar in the form of a transfer cylinder.

The advantage of the proposed sub-apparatus and of the
proposed sub-method is that the cell stacking devices or
removal apparatuses, due to the distribution of the supplied
segments of number A to the two conveyor units correspond-
ing to the smaller number B and C, are stacked at a lower
stacking rate than these are supplied in the number A. This
means that the conveying rate of the feed device can be
designed to be correspondingly high, and at the same time the stacking rate can be designed to be correspondingly low
for a high positional accuracy of the stacked segments and
thus of the stack itself.

The second conveyor unit is preferably designed as a
rotationally drivable conveyor unit, in particular in the form
of a transfer cylinder or as an operatively connected com-
bination of a first rotationally drivable conveyor unit, in
particular in the form of a reversing cylinder and of a second
rotationally drivable conveyor unit, in particular in the form
of a transfer cylinder, which in themselves make possible
very high conveying capacities of the segments. In particu-
lar, the design of the first conveyor unit as a rotationally
drivable conveyor unit makes possible continuous feeding
and removal of the segments to and from the conveyor unit.
Due to the rotational movement of the conveyor unit, the
forces acting on the segments, particularly in the transverse
direction, can be reduced to the lowest possible level, which
in turn makes it possible for the segments to be transported
with very high positional accuracy and thus also the forma-
tion of very positionally accurate stacks.

BRIEF DESCRIPTION OF THE FIGURES

The invention is explained below using preferred embodi-
ments with reference to the accompanying drawings. In the
drawings:

FIG. 1 shows a production machine with a cell stacking
system 1 according to the invention with a first feed device
2, a discharge device 3, an upstream cutting device 4, and a
cell stacking device 7 arranged between the feed device 2
and the discharge device 3. Moreover, the production
machine comprises a feed of four continuous webs (E1-E4),
wherein two of the continuous webs E1 and E3 are formed
from a separator material, one continuous web E2 formed
from an anode material and one continuous web E4 formed
from a cathode material. The continuous webs E2 and E4 of
the cathode material and of the anode material are each cut
by means of a cutting device into anodes and cathodes of a
predetermined length and/or width, which after cutting are
then laid down in each case on one of the continuous webs
E1 and E3 of the separator material. The merging is carried
out by the anodes or cathodes cut from the lowest continuous
web E4 first being laid down individually on a transport belt T, then the continuous web E3 of the separator material that is above said continuous web E4 being laid down, and then again the anodes or cathodes cut from the continuous web E2 being laid down individually on the continuous web E3 of the separator material, which are then covered to form a four-ply continuous web EG by the highest continuous web E1 of the separator material being laid down on top. This four-ply continuous web EG with the anodes or cathodes on one upper side is then supplied to a lamination unit L, in which they are bonded together by thermal and/or mechanical energy action to form a fixed composite. If the four-ply continuous web EG is to have a different structure, the continuous webs E1 to E4 can also be arranged differently.

The laminated four-ply continuous web EG is then supplied into the production machine of the cell stacking system 1 and cut in the cutting device 4 into segments 16 of a predetermined length and/or width, which are also referred to as monocells. However, it is also conceivable to feed the cell stacking system 1 in the production machine with two-ply segments 16 consisting of only one layer of a separator material and an anode or cathode and/or even single-ply segments 16, provided that these are to be further processed in a correspondingly stacked form.

The cutting device 4 is here formed by a pair of cylinders consisting of a cutting cylinder with cutting blades and a counter-cylinder with counter-blades, and cuts the four-ply continuous web EG supplied onto the cutting cylinder or the counter-cylinder by the cutting blades at the counter-blades shearing said web into segments 16 of a predetermined length, which is defined by the distances between the cutting blades or the counter-blades, depending on whether the continuous web is guided onto the cutting cylinder or the counter-cylinder. Starting from the cutting device 4, the cut segments 16 are fed to the feed device 2. The feed device 2 is formed by a cylinder run with several transport cylinders on which the segments 16 are held, e.g. by negative pressure. If the continuous web supplied in is a four-ply continuous web EG, the segments 16 cut from it will correspond to the monocells described above.

Figure 2:
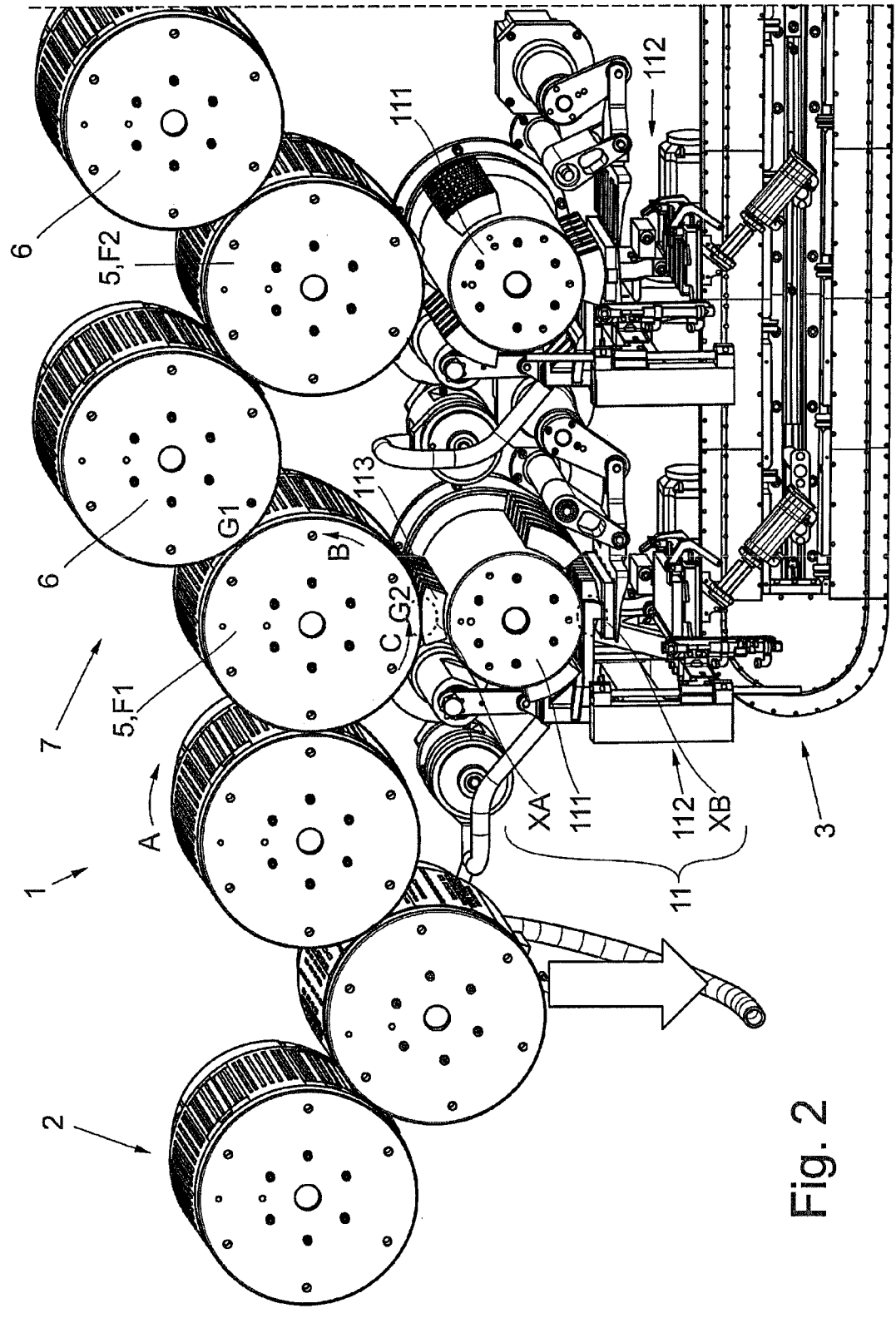
FIG. 2: shows an enlarged view of the cell stacking
system with a cell stacking device and several cell stacking
apparatuses in perspective view.

The cell stacking system 1 with the cell stacking device 7 is shown enlarged in FIG. 2. The feed device 2 comprises four transfer cylinders 5 and three reversing cylinders 6 arranged between two transfer cylinders 5 in each case, wherein only two of them can be seen in the detail of FIG. 2. Moreover, the cell stacking device 7 comprises four cell stacking apparatuses 11, each with a removal apparatus 111 and an associated depositing element 112, of which only two can be seen in the detail of FIG. 2. The removal apparatus 111 is designed as a rotational body driven to perform a rotational movement, e.g. in the form of a cylinder, and has three carrier zones in the form of receiving dogs 113 aligned at angles of 120 degrees to each other. The receiving dogs 113 have an outer surface which in its outer dimensions corresponds at least to the outer shape of the segments 16 or can also be larger than these. In their cross section perpendicular to the axis of rotation of the removal apparatus 111 the receiving dogs 113 have a circular-arcuate contour each with identical radii so that they complement each other to form a virtual circle. Moreover, the removal apparatuses 111 with their receiving dogs 113 are arranged and in their radii dimensioned such that during the rotational movement with the outer surfaces of the receiving dogs 113 they touch the lateral surfaces of the transfer cylinder 5 with a gap corresponding at least to the thickness of the segments 16. Here the rotational movement of the removal apparatus 111 is controlled in relation to the respective transfer cylinder 5 in such a way that during rotation, the receiving dogs 113 each take over exactly one segment 16 from the transfer cylinder 5. For this purpose, the movement of the removal apparatus 111 is controlled such that the lateral surfaces of the receiving dogs 113 at the point of the shortest distance to the transfer cylinder 5, which corresponds to the receiving station XA, have a circumferential speed corresponding to the circumferential speed of the segments 16 held on the transfer cylinder 5, and the segments 16 are ideally taken over by the receiving dogs 113 without a relative speed in the circumferential direction.

The lateral surfaces of the receiving dogs 113 have in the circumferential direction at least one circular arc length which corresponds to the width of the segments 16 in the circumferential direction of the transfer cylinder 5, so that the segments 16 are taken over by the receiving dogs 113 over their entire surface. Moreover, the receiving dogs 113 also have a length in the axial direction of the removal apparatus 111 which corresponds at least to the length of the segments 16 in the axial direction of the removal cylinder 5. The receiving dogs 113 have a comb-like structure with a plurality of fins that are parallel to each other and oriented in the circumferential direction, between which fins gaps with a constant and identical width are arranged. The front faces of the fins then together form the lateral surfaces of the receiving dogs 113.

The receiving dogs 113 each form a receiving surface 123 on their outer sides which, due to the plurality of receiving dogs 113, are separated from each other by free zones 124.

Vacuum lines 122 are provided in the fins of the receiving dogs 113, which can be subjected to negative pressure and whose openings open into the end-face lateral surfaces of the fins or receiving dogs 113. Moreover, corresponding openings for vacuum lines that can be subjected to negative pressure can also be provided in the lateral surfaces of the transfer cylinders 5. The segments 16 are then held on the lateral surfaces of the transfer cylinders 5 by the application of negative pressure in the vacuum lines and are taken over by the removal apparatus 111 by the negative pressure in the vacuum lines of the transfer cylinder 5 being switched off, and by the negative pressure in the vacuum lines 122 of the receiving dog 113 passing through the receiving station XA being switched on, as can be seen in the left-hand illustration in FIG. 4.

The rotational movement of the removal apparatuses 111 and thus of the receiving dogs 113 is controlled such that they receive the segments 16 from the transfer cylinders 5 in a predetermined sequence. In the present exemplary embodiment, four cell stacking apparatuses 11 are provided in the cell stacking device 7, so that each of the cell stacking apparatuses 11 receives segments 16 from the feed device 2 in a fixed sequence in a four-based rhythm. The first removal apparatus 111 of the first cell stacking apparatus 11, which removal device is assigned to the first transfer cylinder 5, in one revolution takes over with one of its receiving dogs 113 the first segments 13 of a group of four from the first transfer cylinder 5. The segments 16 remaining from the group of four on the first transfer cylinder 5 are then received by the first reversing cylinder 6 and passed on to the second transfer cylinder 5. Due to the transfer of the segments 16 to the second transfer cylinder 5 via the reversing cylinder 6, the segments 16 are rotated once about their longitudinal axes which are parallel to the axes of rotation of the transfer cylinder 5 and of the reversing cylinder 6, so that on the second transfer cylinder 5 they are oriented outwards with the same upper side as on the first transfer cylinder 5. The second cell stacking apparatus 11 then removes the second segments 16 of the group of four from the second transfer cylinder 5 in the same way using the receiving dogs 113 of the second removal apparatus 111, as can be seen in FIG. 2. This process is repeated until finally the fourth cell stacking apparatus 11 removes the last segments 16 of the group of four from the fourth transfer cylinder 5 and all segments 16 of the group of four have been received by the cell stacking apparatuses 11. Since each of the removal apparatuses 111 has three receiving dogs 113, the segments 16 are removed from the feed by the receiving dogs 113 in three groups of four until all segments 16 have been removed after transfer by the last transfer cylinder 5.

Figure 3:
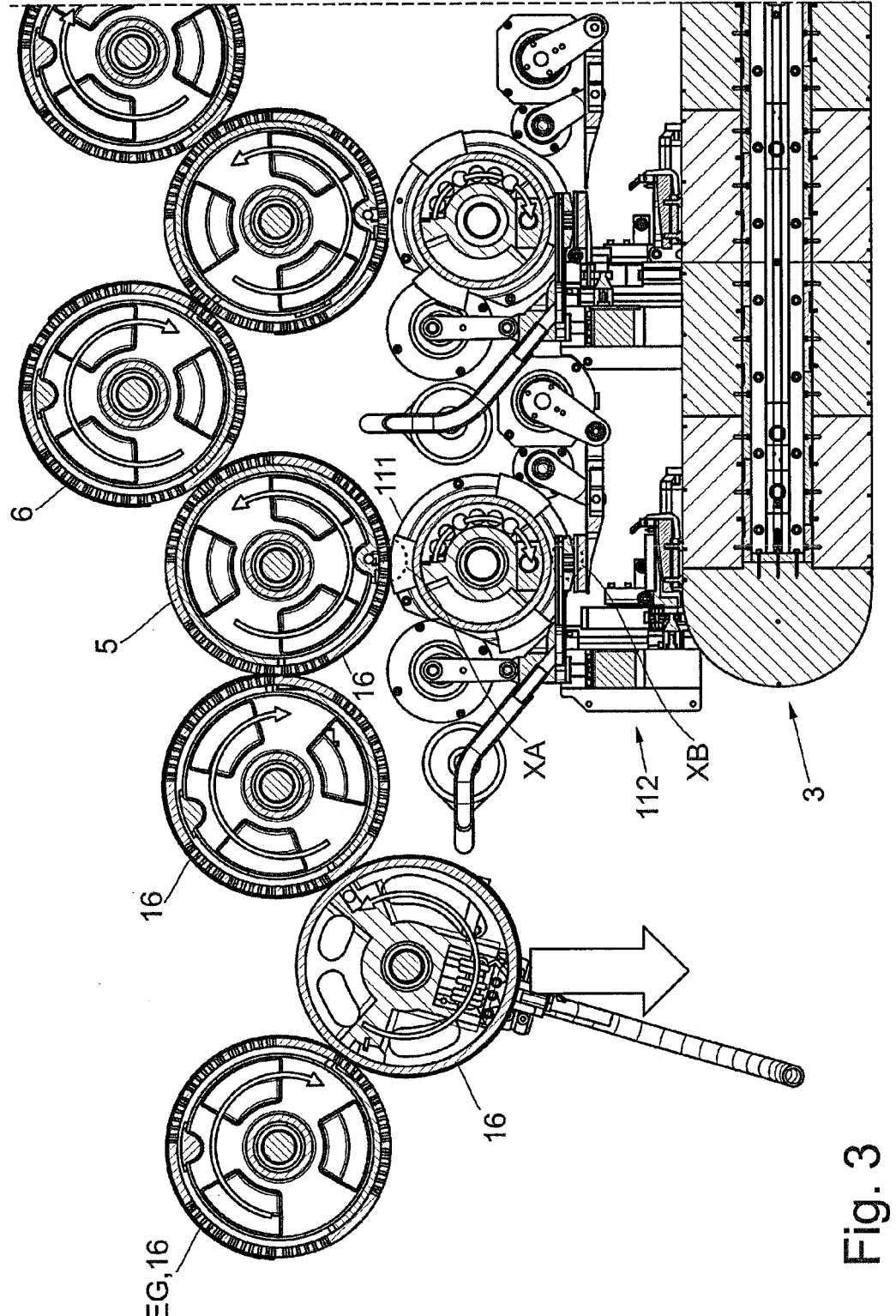
FIG. 3: shows an enlarged view of the cell stacking
system in cross section with the directions of rotation of the
cylinders marked.
Figure 4:
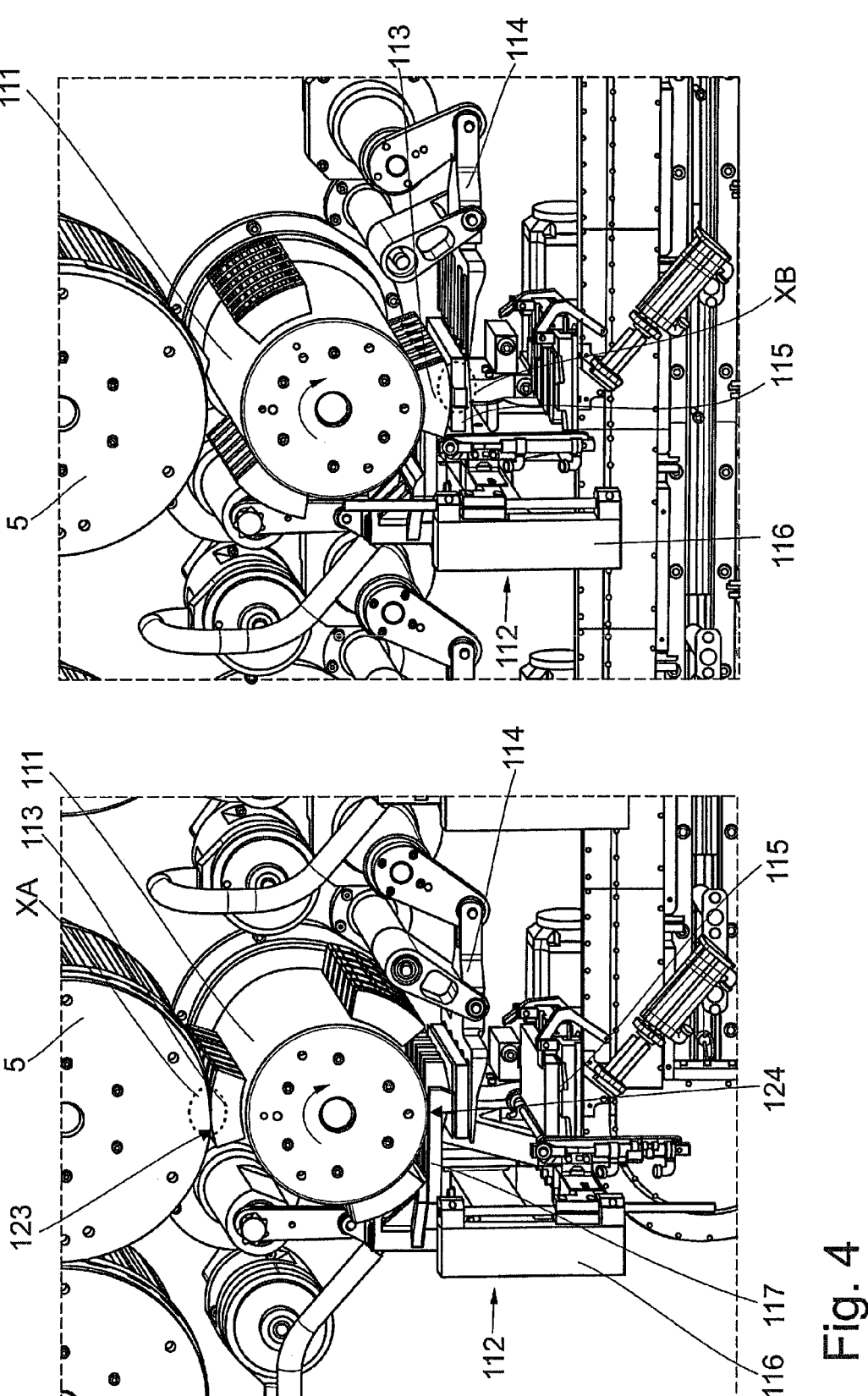
FIG. 4: shows two representations of a cell stacking
apparatus in each case with one removal apparatus arranged
in a receiving position and one in a transfer position in a
perspective view.
Figure 5:
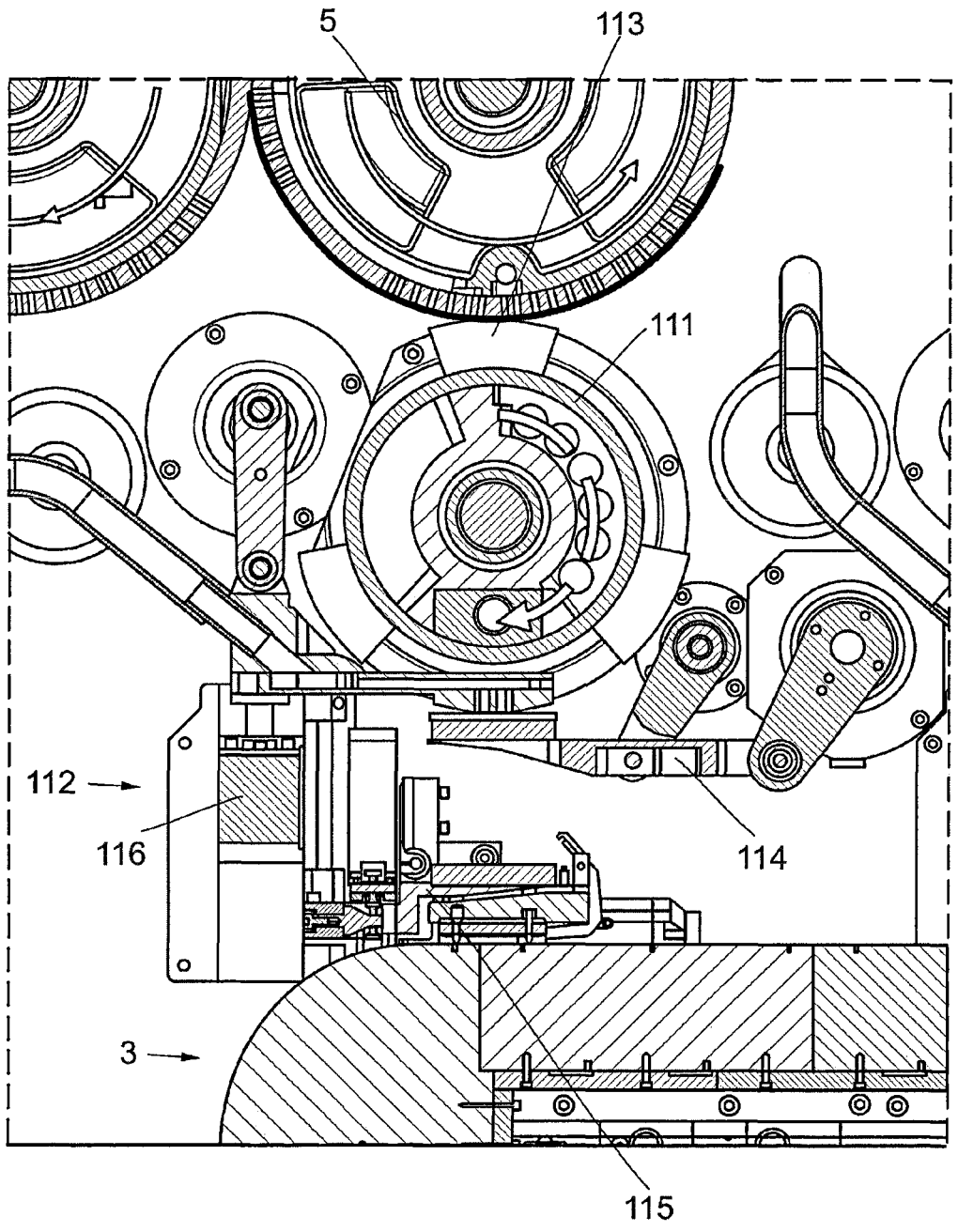
FIG. 5: shows a removal apparatus in the receiving
position with a transfer device in a holding position in a
sectional view.
Figure 6:
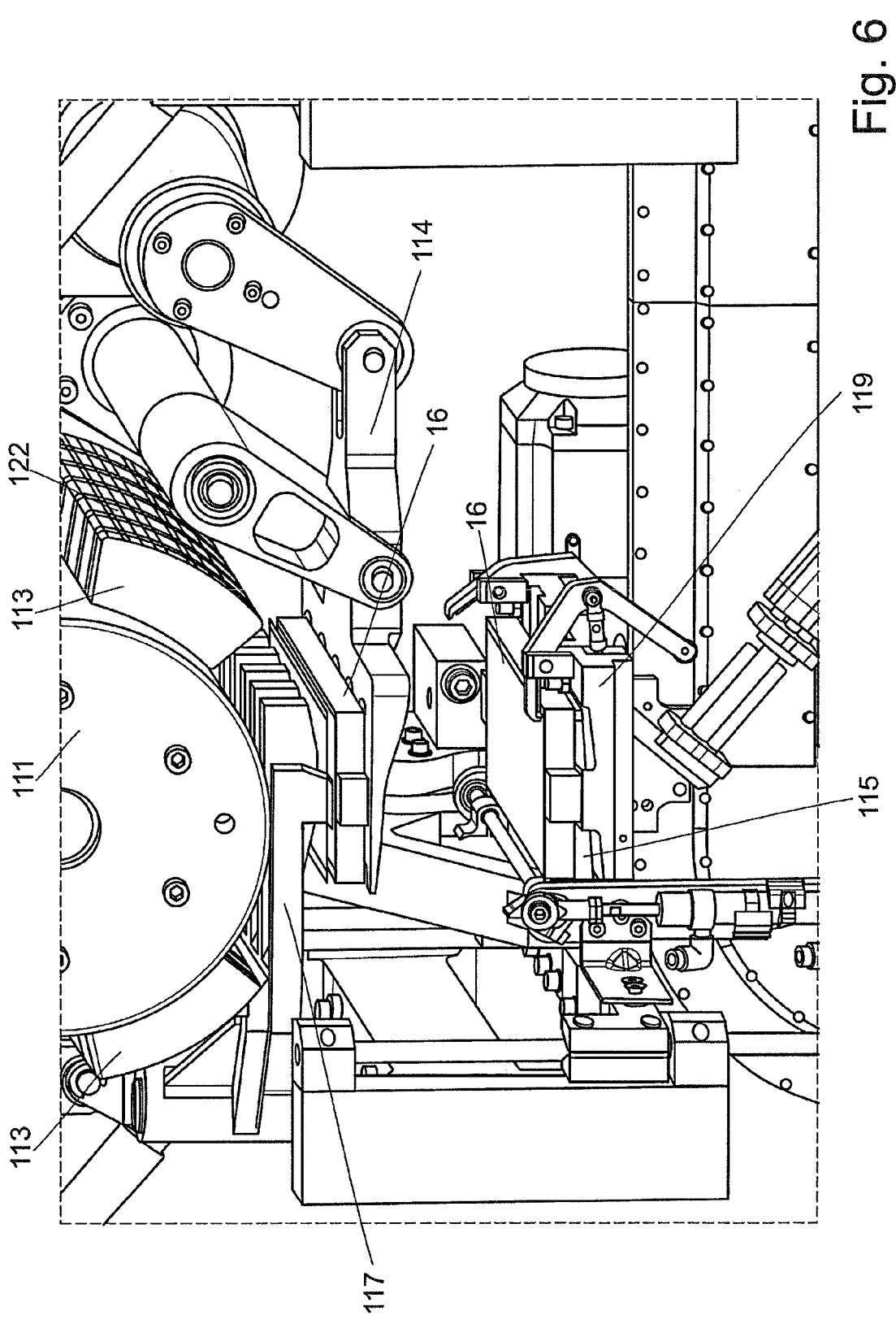
FIG. 6: shows a removal apparatus in the receiving
position with a transfer device in a holding position in a
perspective view.

In FIG. 4, a cell stacking apparatus 11 according to the invention with a depositing element 112 according to the invention can be seen in an enlarged view in two different positions. The removal apparatus 111 is arranged between the transfer cylinder 5 and the depositing element 112 and receives the segments 16 from the transfer cylinder 5 according to the procedure described above. The removal apparatus 111 is driven to rotate in a clockwise direction, as can be seen from the direction of the arrow in FIGS. 3 and 4. During the reception in each case of one of the segments 16, the removal apparatus 111 is located with one of its receiving dogs 113 in the "12 o'clock position" and passes with said receiving dog through the receiving station XA, as can be seen in the left-hand illustration in FIG. 4. This position of the removal apparatus 111 with a receiving dog 113 arranged in the "12 o'clock position" is within the meaning of the invention also referred to as the receiving position of the removal device 111. The receiving dog 113, which has received from the removal cylinder 5 the segment 16 of the previous group of four, is in this position in the "4 o'clock position". In this takeover position, the removal apparatus 111 rotates at a circumferential speed of the lateral surfaces of the receiving dogs 113, which corresponds to the circumferential speed of the segments 16 on the transfer cylinder 5 and receives a segment 16 with the receiving dog 113 arranged in the "12 o'clock position." Another receiving dog 113 is in the "8 o'clock position," which receiving dog is not carrying a segment 16 and therefore has a free lateral surface since it has just delivered a segment 16 to the depositing element 112. Here the removal apparatus 111 is in a position in which it passes the depositing element 112 with a free zone 124 in the form of a free space so that in this receiving position a collision of the removal apparatus 111 with the depositing element 112 is ruled out and/or the depositing element 112 with its parts can perform movements towards the removal apparatus 111.

In order to transfer the segment 16 from the receiving dog 113 located in the "4 o'clock position" in the receiving position of the removal apparatus 111, the removal apparatus 111 is decelerated during the further rotational movement until the removal apparatus 111 with the receiving dog 113 previously arranged in the "4 o'clock position" is arranged in the "6 o'clock position" and passes through the transfer station XA, as can be seen in the right-hand illustration in FIG. 4.

The transfer station XB is the point of the shortest distance between the lateral surface of the transferring receiving dog 113 and of the depositing element 112. Since there is an uneven number of receiving dogs 113, the transfer station XB can be arranged in the "6 o'clock position" opposite the receiving station XA in the "12 o'clock position" without two of the receiving dogs 113 passing the receiving station XA and the receiving station XB II at the same time. The position of the removal apparatus 111 with the receiving dog 113 arranged in the "6 o'clock position" is also referred to as the transfer position of the removal apparatus 111 within the meaning of the invention.

During this rotational movement, the removal apparatus 111 was decelerated until the removal apparatus 111 in the transfer position is rotating at a much lower circumferential speed or is even very briefly at a standstill. In the transfer position of the removal apparatus 111, the segment 16 is transferred from the receiving dog 113 arranged in the "6 o'clock position" to the depositing element 112, which is explained in more detail below. Since the receiving dog 113 in this position is rotating at a much lower circumferential speed or ideally is even at a standstill, the segment 16 is transferred with much lower transverse forces than would be possible without a deceleration of the removal apparatus 111. In the case in which the removal apparatus 111 is at a standstill, the segment 16 is transferred to the depositing element 112 even without any transverse forces solely in one movement in the direction of the surface normal of the segment 16. As a result, the segments 16 are subjected to the lowest possible transverse forces during transfer and can therefore then be stacked into a stack with a very high positional accuracy.

Moreover, the third free receiving dog 113, when the removal apparatus 111 is in this position, i.e. in the transfer position, is at a standstill, and/or at the low rotation speed, is in the "10 o'clock position" and at an angle of 60 degrees to the receiving station XA of the transfer cylinder 5, is in the "12 o'clock position". Since the free receiving dog 113 in the receiving position of the removal apparatus 111 must again be at the circumferential speed of the segments 16 on the transfer cylinder 5, the removal apparatus 111 is then accelerated again until the free transfer dog 113, previously in the "10 o'clock position," in the "12 o'clock position" passes through the receiving station XA at the circumferential speed of the segments 16 being supplied onto the receiving cylinder 5 and takes over a segment 16.

The removal apparatus 111 in the form of the rotationally driven rotational body with the three receiving dogs 113 arranged at an angle of 120 degrees to each other is thus accelerated and decelerated in a repeating sequence, wherein during one revolution, the rotational body is decelerated and accelerated three times corresponding to the number of receiving dogs 113. The removal apparatus 111 can also have an even number of receiving dogs 113, in which case the receiving station XA and the transfer station XB must be positioned differently, e.g. in the "12 o'clock position" and the "4 o'clock position," since due to the different requirements with regard to the movement states of the removal apparatus 111 during the reception and transfer of the segments 14, it is not possible for a segment 16 to be transferred at the same time as a second segment 16, i.e. two receiving dogs 113 cannot pass through the receiving station XA and the receiving station XB at the same time. It is therefore advantageous to provide an uneven number of removal dogs 113, since the receiving station XA and the transfer station XB can thereby be arranged opposite one another, i.e. in the "12 o'clock position" and the "6 o'clock position," and thus at an angle of 180 degrees to one another, as can be seen in the two illustrations in FIG. 4. Here the movement of the removal apparatus 111 is controlled in such a way that the removal apparatus 111 as a whole is decelerated and accelerated without the distances between the receiving dogs 113 changing. The removal apparatus 111 is formed here by a rotationally driven rotational body in the form of a cylinder, so that the receiving dogs 113 are in this case arranged at constant angles to one another during the rotational movement. The receiving dogs 113 are arranged equidistantly at identical angles to each other and are driven together with the base body of the removal apparatus 111. The advantage of this solution is that the acceleration and deceleration of the segments 16 in the transfer station XB and the receiving station XA described above is realized solely by a single controller of the movement of the removal apparatus 111, while the receiving dogs 113 themselves do not carry out any individualized controlled movement but are instead decelerated and accelerated as an assembly. In this way the entire control and the structural design can be simplified. In particular, the receiving dogs 113 do not require any separate movable bearing on the removal apparatus 111. Here it is particularly advantageous to arrange the transfer station XB in the "6 o'clock position," i.e. below the removal apparatus 111, since the transfer of the segments 16 does not take place against the acting force of gravity and is even supported thereby.

The depositing element 112 has a receptacle 115 that can be moved linearly by means of a lifting device 116, wherein the movement of the receptacle 115 is triggered by an activation of the lifting device 116 and is guided by means of a guidance device, e.g. a guide rod. The receptacle 115 can be moved linearly between a receiving position and a dispensing position, wherein the receiving position of the receptacle 115 is arranged as close as possible to the transfer station XB of the segments 16, while the dispensing position of the receptacle 115 corresponds to a more distant position of the receptacle 115 assigned to the discharge device 3.

Moreover, the depositing element 112 has a depositing lever 117 with a comb-like structure with a plurality of fins 118 oriented parallel to one another, which are dimensioned in width and arrangement such that when the removal apparatus 111 rotates, due to their position or by an active movement, they engage in the gap between the fins 118 of the receiving dogs 113 and, in the transfer station XB, passively or actively comb out the segment 16 held thereon from the receiving dog 113. If the receiving dogs 113 are at a standstill in the transfer station XB, it is advantageous that the depositing lever 117 itself executes a movement towards the receiving dogs 113 and actively combs the segments 16 out of the lateral surfaces of the receiving dogs 113. The depositing lever 117 is driven by a drive device to a periodic linear lifting movement. During the movement of a receiving dog 113 into the transfer station XB, the depositing lever 117 with its fins enters the spaces between the fins of the receiving dog 113 under the segment 16 that is held thereon. To remove the segment 16, the depositing lever 117 then carries out a linear lifting movement in the radial direction of the removal apparatus 111 and thereby takes the segment 16 along in the direction of its surface normal. Due to the direction of the discharge movement of the segment 16, the smallest possible forces act on the segment 16 and a particularly gentle discharge movement of the segment 16 can be realized. The linear lifting movement of the depositing lever 117 ends with the deposition of the segment 16 in the receptacle 115 of the depositing element 112. The stroke of the lifting movement of the depositing lever 117 is controlled such that the segment 16 is deposited in the receptacle 115 if possible without a falling movement and with the lowest possible compressive force. For this purpose, the stroke is controlled as a function of the increasing stack height of the segments 16 stacked in the receptacle 115, in that the stroke decreases as the number of stacked segments 16 increases. Alternatively, after the deposition of a segment 16 the receptacle 115 can also be driven to a lifting movement by means of a linear drive device, wherein the stroke in this case corresponds at least to the thickness of the segment 16. The stroke of the depositing lever 117 can thereby be selected to be constant. However, it is preferred that the receptacle 115 in this case be moved away from the removal apparatus 111 by a stroke corresponding to the thickness of the segment 16 plus a slight additional distance of, for example, one millimeter. In order to ensure that the segments 16 are always deposited at a constant distance from the stack surface that is as small as possible, the depositing lever 117 is driven to perform a lifting movement in which the stroke is increased by the additional distance of, in this case, ideally one millimeter each time a segment 16 is deposited. Due to the proposed solution, the receptacle 115 is additionally moved away from the removal apparatus 111 by a factor corresponding to the number of stacked segments 16 multiplied by the additional distance, so that an additional free space is formed into which the transfer device 114, described in more detail below, can move without any further movement of the receptacle 115 being necessary. If the additional distance is 1 millimeter and the number of segments 16 in the stack is twenty, the receptacle 115 was then moved an additional twenty millimeters away from the removal apparatus 111, i.e. away from the transfer station XB, and the transfer device 114 can be moved into its holding position in the transfer station XB without any further movement of the receptacle 115 for setting down the subsequent segments 16.

A vacuum channel system extends in the depositing lever 117. The vacuum channel system has a supply channel. Several branch channels branch off from the supply channel. The branch channels are arranged leading away from the supply channel and towards a free surface of the depositing lever 117.

Figure 7:
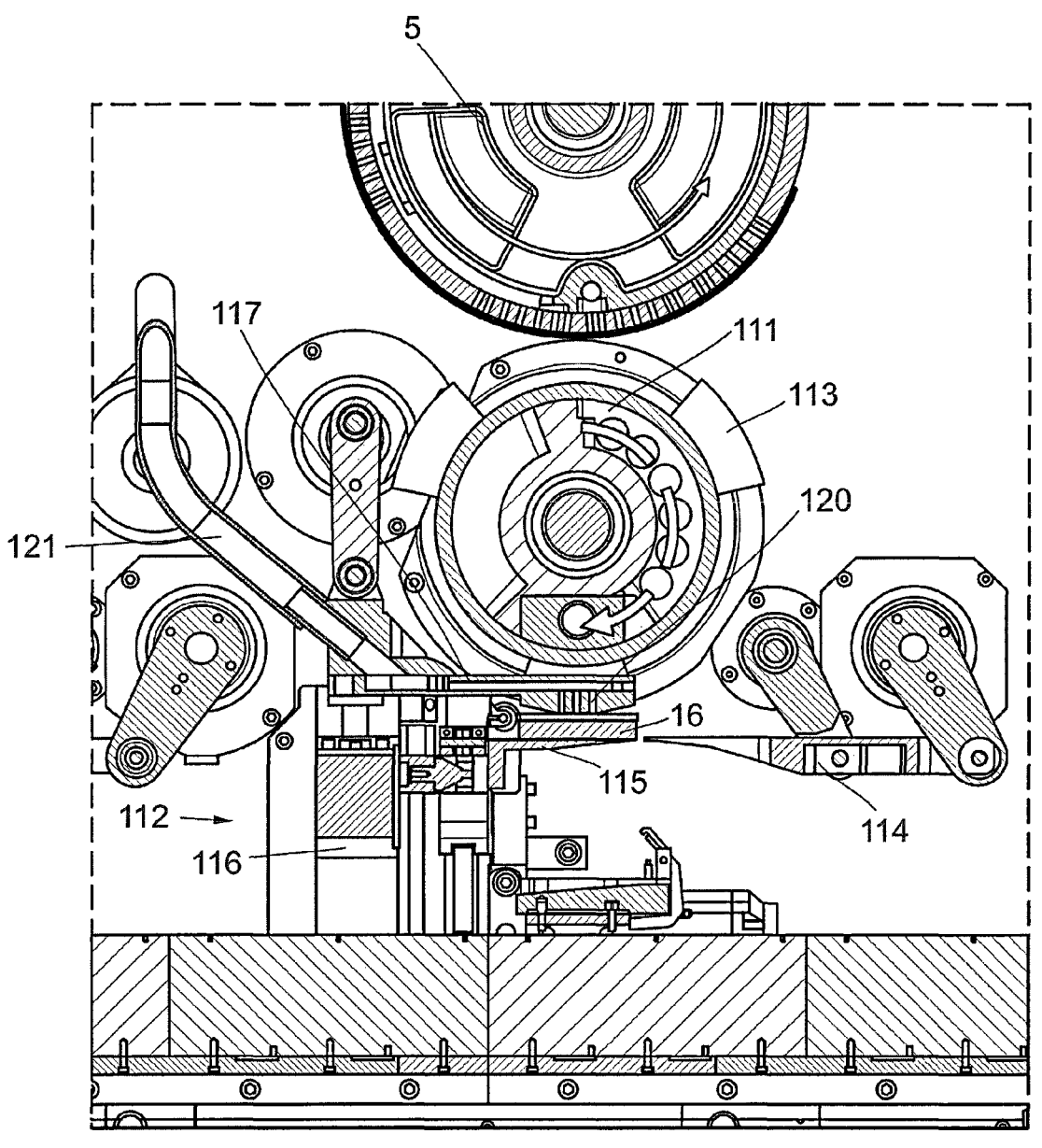
FIG. 7: shows a removal apparatus in the transfer position
with a transfer device in a ready position in a sectional view.
Figure 8:
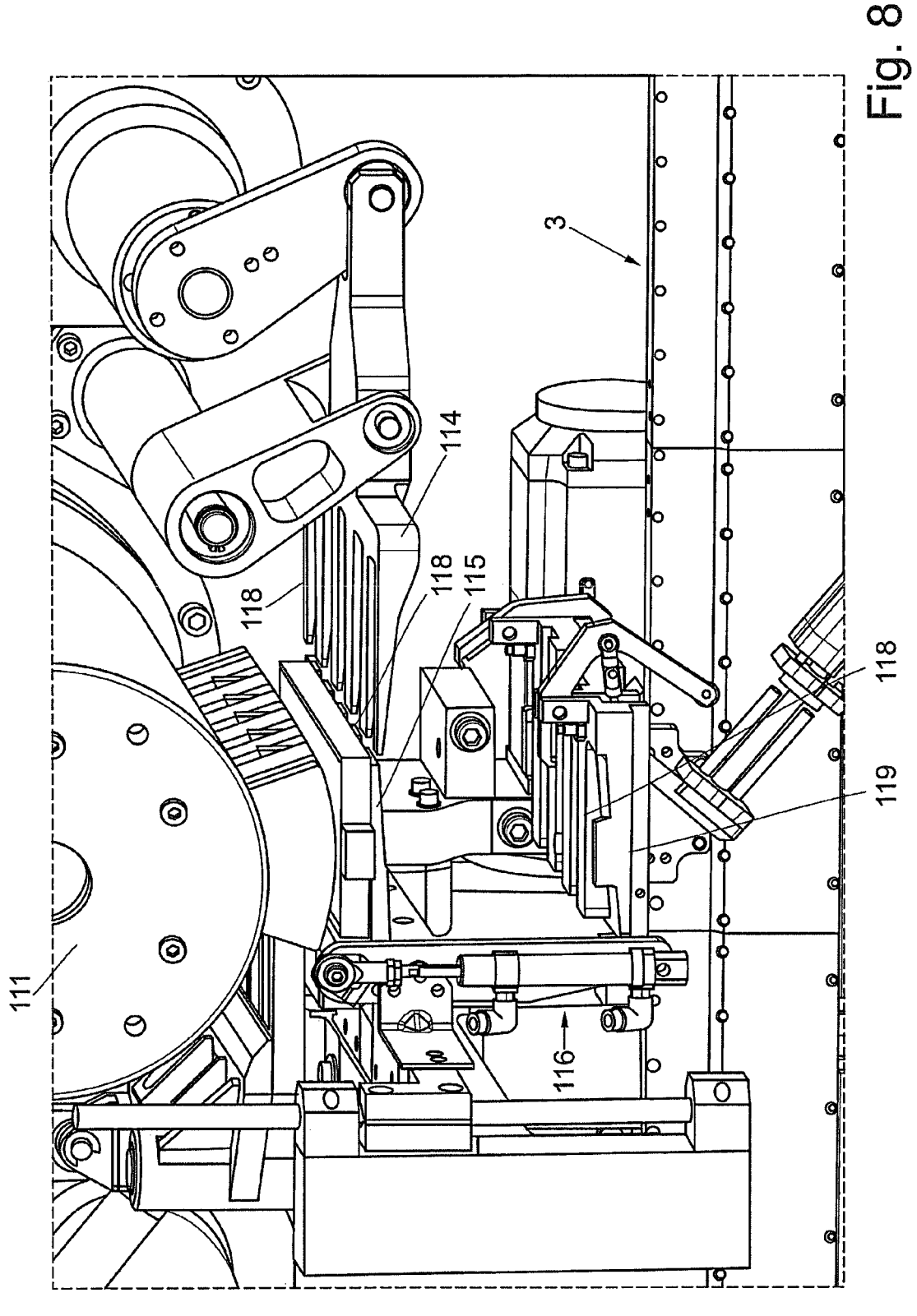
FIG. 8: shows a removal apparatus in the transfer position
with a transfer device in a ready position in a perspective
view.

In the depositing lever 117, a plurality of vacuum lines 120 are provided, which can be seen in FIG. 7. The vacuum lines 120 open out with their openings into the underside of the depositing lever 117 and into a receiving surface provided thereon. In addition, the vacuum lines 120 are connected to an external, inherently flexible line of an external vacuum supply 121. The vacuum supply 121 with negative pressure in the vacuum lines 120 of the depositing lever 117 is controlled such that the negative pressure in the vacuum lines 120 is already present when a segment 16 is supplied into the receiving station XA via a receiving dog 113, and the segment 16 is still being held on the receiving dog 113 via the negative pressure acting in the vacuum lines 122 of the receiving dog 113. In the receiving station XA, the depositing lever 117 comes to rest with its underside on the upper side of the segment 16, which at this time is still being held by suction via the same surface by means of the vacuum lines 122 of the receiving dog 113. The segment 16 is thus briefly held by suction at its upper side by the negative pressures acting in the vacuum lines 120, 122 of the receiving dog 113 and of the depositing lever 117 at the same time and in the same direction in this case. Only when the depositing lever 117 holds the segment 16 via the negative pressure in its vacuum lines 120, is the negative pressure in the vacuum lines 122 of the receiving dog 113 switched off. In this case, the vacuum in the vacuum lines 122 of the receiving dog 113 and the movement of the depositing lever 117 overlap, so that the segment 16 is peeled off the depositing lever 117 against the vacuum still present in the vacuum lines 122 of the receiving dog 113. The segment 16 is thus permanently exposed to a suction force, first from the removal apparatus 111 and then from the depositing lever 117. This completes the transfer of the segment 16 from the removal apparatus 111 to the depositing lever 117, and the depositing lever 117 deposits the segment 16 in a linear lifting movement into the receptacle 115 of the depositing element 112. In order that the depositing lever 117 can carry out the linear lifting movement and the segment 16 be held during this on the depositing lever 117 by a negative pressure, the vacuum lines 120 are connected to an external vacuum supply via a flexible line 121. Due to the flexible line, the vacuum supply can also be realized via the interface between the parts moving relative to each other. On its upper side facing the segment 16 to be transported away, the depositing lever 117 has a curved receiving surface which is formed by the front faces of the fins of the depositing lever 117. The curvature of the surface corresponds to the curvature of the receiving surface 123 of the receiving dog 113, so that the fins of the depositing lever 117 and of the receiving dog 113 complement each other in the engaged position of the depositing lever 117 to form an enlarged, homogeneous, curved contact surface.

As a result, the fins 118 of the depositing lever 117 complement the fins 118 of the receiving dogs 113 to form an almost continuous, homogeneous support surface when in the engaged position they engage in the spaces between the fins of the receiving dogs 113. Due to the identical curvature, the receiving dog 113 with the segment 16 held thereon moves tangentially along the curved surface of the depositing lever 117, and the depositing lever comes into an engaged position in the spaces of the receiving dog 113 between the segment 16 and the base body of the removal apparatus 111. The segments 16 are held by suction during the rotational movement of the removal apparatus 111 by the negative pressure acting in the compressed air lines 122 of the receiving dogs 113 and are held in a curved position on the surface of the receiving dogs. In the depositing lever 117, compressed air lines 120 are also provided, which are also subjected to negative pressure when the depositing lever 117 is in contact with the surface of the segment 16. The segments 16 are thus simultaneously held by suction and fixed in place for a very short period of time by the negative pressure acting in the compressed air lines 120 of the depositing lever 117 and the negative pressure acting in the compressed air lines 122 of the receiving dog 113. Only when the depositing lever 117 has taken over by the negative pressure acting in its compressed air lines 120 will the negative pressure in the compressed air lines 122 of the receiving dog 113 be switched off and the depositing lever 117 be able to transport the segment 16 away. In this case, the negative pressure in the receiving dog 113 can persist for a short period of time, so that the depositing lever 117 must pull the segment 16 off the receiving surface 123 of the receiving dog 113 against the force exerted by the negative pressure in the vacuum lines 122.

Individual separator sheets or monocells with separator sheets come into consideration as segments 16, wherein one or each separator sheet has a thickness of 8 to 25 μm, preferably 10 to 15 μm. With such thin separator sheets, very high specific energies and energy densities can be achieved while maintaining a very compact structure. Moreover, the cell stacking system 1 can be used for stacking anodes and/or cathodes and/or segments 16 or monocells with one anode, one cathode and two separator sheets with an electrode area of 2×4 cm for producing microcells, in particular micropouch cells. The cell stacking system 1 can also be used for stacking anodes and/or cathodes and/or segments 16 or monocells with one anode, one cathode and two separator sheets with an electrode area of 15×40 cm for producing cells of a larger area. The areas of the receiving surfaces 123 of the receiving dogs 113 are dimensioned such that the segments 16 or the monocells can be received and transported over their entire surface or part of their surface. Examples of the dimensions of the anodes and/or cathodes lie within the range from 100×50 mm to 200×100 mm, in particular from 120×60 mm to 180×90 mm with electrode areas from 800 mm² to 80,000 mm², in particular in the range from 1200 mm² to 60 000 mm² or 1800 mm² to 36,000 mm².

The fins 118 preferably form with their surfaces a surface area of 30 to 70% of the surface of the receiving surfaces 123 of the receiving dogs 113, so that a segment 16 held thereon rests flat on a receiving surface 123 with an area of 30 to 70% of its surface. The segment 16 can be held in place on the receiving surfaces 123 via the negative pressure in the vacuum lines 122. The proposed surface area is preferred in that it makes possible a gentle reception and a gentle transportation of the segments 16 while at the same time fastening the segments 16 in a precise position and with an engagement of the depositing lever 117 through the spaces between the fins 118 by a lifting movement thereby made possible.

If the receiving dogs 113 in the transfer station XB are at a standstill or rotating at a slower speed, it will be advantageous for the depositing lever 117 itself to move towards the receiving dogs 113 and actively comb out the segments 16 from the lateral surfaces of the receiving dogs 113. The depositing lever 117 is driven by a drive device to a periodic linear lifting movement. During the movement of a receiving dog 113 into the transfer station XB, the depositing lever 117 with its fins 118 enters the spaces between the fins 118 of the receiving dog 113 under the segment 16 held thereon. To remove the segment 16, the depositing lever 117 then carries out a linear lifting movement in the radial direction of the removal apparatus 111 and thereby takes the segment 16 along in the direction of its surface normal. Due to the direction of the discharge movement of the segment 16, the smallest possible forces act on the segment 16 and a particularly gentle discharge movement of the segment 16 can be realized. The linear lifting movement of the depositing lever 117 ends with the deposition of the segment 16 in the receptacle 115 of the depositing element 112. The stroke of the lifting movement of the depositing lever 117 is controlled such that the segment 16 is deposited in the receptacle 115 if possible without a falling movement and with the lowest possible compressive force.

The receptacle 115 can also have vacuum lines which can be subjected to negative pressure and which are arranged with their openings in such a way that, when negative pressure is applied, they generate a suction force on the segments 16 to be received. The segments 16 can then be transferred at the transfer point II by the negative pressure in the vacuum lines of the receiving dog 113 arranged in the "6 o'clock position" being switched off and by suction applied to the segments 16 by the vacuum lines of the receptacle 115 transferred from the removal apparatus 111 into the receptacle 115 of the depositing element 112 in addition to the combing-out process, described above, performed by the depositing lever 117.

This process of dispensing the segments 16 from the receiving dog 113 of the removal apparatus 111 into the receptacle 115 of the depositing element 112 is repeated until a suitable sensor device detects that a predetermined height of the stack of segments 16 built up in the receptacle 115 has been exceeded or that a predetermined number of segments 16 stacked in the receptacle 115 has been reached. Depending on the signal from the sensor device, the lifting device 116 is then activated and the receptacle 115 with the stack of segments 16 is moved linearly from the receiving position to the dispensing position on the discharge device 3. Basically, the number of segments 16 supplied in and the number of segments 16 discharged in preceding ejection devices are also known in the machine controller of the production machine and of the cell stacking system, so that the lifting device 116 can also be activated when the attainment of the prespecified number of segments 16 to be stacked is detected on the basis of the number of stacked segments 16 known in the machine controller.

The lifting device 116 is controlled during the deposition of the segments 16 in the receptacle 115 such that, after each deposition of a segment 16, the receptacle 115 is moved away from the removal apparatus 111 by a distance corresponding to the thickness of a segment 16 plus a small additional distance. This makes it possible to achieve a very gentle deposition of the segments with the lowest possible drop height by selecting the dispensing point of the segments 16 to be as close as possible over the surface by switching off the negative pressure in the vacuum lines 120 of the depositing lever 117. In addition, the receptacle 115 with the stack held therein is gradually moved away from the removal apparatus 111 with each deposition of a segment 16 by controlling the lifting movement, so that a new free space is created for the deposition of the subsequent segment 16. This prevents the depositing lever 117 from exerting a compressive force on the segment 16 the next time a segment 16 is deposited.

Firstly, the provided additional distance provides a certain safety reserve to compensate for tolerance deviations in the thickness of the segments 16 and in the movement sequence, and secondly, the sum of the additional distances provides a free space after the target stack height has been reached, which simplifies or enables the transfer device 114 to be moved into the holding position.

During deposition of the segments 16 in the receptacle 115, the depositing lever 117 performs a stroke which is increased by an additional distance after each deposition of a segment 16 and which ideally corresponds to the additional distance of the stroke of the receptacle 115, and, by the negative pressure in its vacuum lines 120 being switched off, deposits the segment 16 in a position as close as possible to the surface of the stack held in the receptacle 115. In this way, the momentum acting on the segments 16 during deposition can be kept as low as possible. In addition, in adaptation to the outer surfaces of the receiving dogs 113 the depositing lever 117 has a curved outer surface on which the segment 16 is held, while the segment has a flat, planar orientation when stacked in the receptacle 115. At dispensing the segment 16 must therefore additionally move from the curved position to the flat position, which in turn means that the edge portions must cover a slightly greater distance during deposition. This unequal movement means that the segment 16 may tend to exhibit a "fluttering movement" during deposition. In order to counteract this tendency, it is advisable for the depositing lever 117 to deposit the segment 16 as close as possible to the surface of the stack and then to be held above the deposited segment 16 for a short period of time in order to damp possible fluttering movements of the segment 16.

The depositing element 112 further comprises the transfer device 114 which can be moved from a ready position into a holding position and which is arranged in the holding position during the movement of the receptacle 115 for transporting away the stacks and forms an intermediate support for deposition of the segments 16, as can be seen in the left-hand illustration in FIG. 4. The transfer device 114 provided makes it possible for the segments 16 to be deposited even when the receptacle 115 filled with the previously completed stack is moved from the removal apparatus 111 into the dispensing position for the transfer of the stack and is thus not available for receiving the segments 16 in the transfer station XB. This allows for an uninterrupted, i.e. continuous, dispensing of the segments 16 from the removal apparatus 111 at the high stacking rate thereby made possible.

If the target height of the stack and/or the target number of segments 16 in the stack of the receptacle 115 is detected via the sensor device, the transfer device 114 will be moved from the ready position to the holding position by utilizing the free space created due to the movement of the receptacle 115 and/or due to the free spaces present between the receiving dogs 113. Here, the transfer device 114 is moved with its support surface into a space between the receptacle 115 and/or the stack of segments 16 built up therein and the notional outer diameter of the receiving dog 113, so that the next segment 16 from the next receiving dog 113 is not deposited on the stack in the receptacle 115 but instead on the support surface of the transfer device 114. The transfer device 114 then forms an intermediate receptacle in the holding position for the deposition of the segments 16. Once the transfer device 114 with its support surface is arranged in the holding position, the lifting device 116 is activated and the receptacle 115 with the stack of segments 16 is moved in a linear movement vertically downwards from the receiving position into a dispensing position assigned to the discharge device 3.

The segments 16 to be subsequently deposited are then not deposited in the receptacle 115 but instead on the transfer device 114, which is arranged in the holding position and remains stationary during this phase. In order to ensure despite this that no compressive force is exerted on the segments 16 during deposition, the stroke of the depositing lever 117 is controlled as a function of the increasing stack height of the segments 16 on the transfer device 114, by the stroke decreasing as the number of stacked segments 16 increases. The transfer device 114 is specially designed by means of an articulated mechanism to perform a movement from the ready position to the holding position and vice versa. Since, however, a pure lifting movement is useful for compensating for the stack height of the segments 16, which lifting movement is not equal to the movement of the transfer device 114, so that the stack is stacked up positionally accurately with the side surfaces arranged at right angles to one another, the compensation for the stack height is preferably implemented here by the described control of the lifting movement of the depositing lever 117, while the transfer device 114 is deliberately kept stationary in order to implement a support surface that in this phase cannot be moved.

The receptacle 115 is moved linearly in the direction of the surface normal of the segments 16 stacked to form the stack, so that during this movement as few transverse forces as possible act on the stack and the segments 16. This ensures that the positionally accurately stacked segments 16 do not slip sideways individually nor in the accurately positioned stack as a whole. If this makes sense, the segments 16 stacked to form the stack can also be additionally attached to one another by means of a tape.

In order that the segments 16 are only deposited on the transfer device 114 when the receptacle 115 is not arranged in the transfer station XB, the transfer device 114 is moved from the holding position back into the ready position shown in the right-hand illustration in FIG. 4 as soon as the receptacle 115 has been moved back to the transfer station XB.

The receptacle 115 and the transfer device 114 each have a support surface which is formed by the surfaces of a plurality of identical fins 118 arranged parallel and equidistant from one another. During their movements for transferring the stacks of segments 16 the transfer device 114 and the receptacle 115 engage with each other with their fins 118. Thus, after the stack has been dispensed to the discharge device 3, the receptacle 115 is moved back into the receiving position and in the process its fins 118 come into engagement between the fins 118 of the transfer device 114. In this position, the receptacle 115 and the transfer device 114 briefly form a common support surface for the stack of segments 16 to be stacked. The transfer device 114 is then moved from the holding position back into the ready position by being moved laterally parallel to the fins 118 and thereby disengaging from the fins 118 of the receptacle 115. The stack is then supported exclusively by the support surface of the receptacle 115 and the further segments 16 are stacked on the stack held in the receptacle 115 until the intended stack height of the stack is reached, and the process is repeated.

Due to the proposed design of the support surfaces of the receptacle 115 and of the transfer device 114 with the fins 118, the receptacle 115 can be moved back into the receiving position after the stack has been delivered without colliding with the transfer device 114 and/or without disturbing the deposition of the segments 16 onto the transfer device 114 which is currently taking place. In addition, the transfer device 114 can thereby be moved from the holding position back into the ready position without the stack thereby losing its support.

The fins of the receiving dog 113, of the transfer device 114 and of the receptacle 115 in each case form a profiled surface with a structure which makes possible a mutual engagement of the transfer device 114 with the receiving dog 113 and the receptacle 115. For this purpose, the fins of one part are arranged corresponding to the free spaces in the other part. To ensure that the engagement movement can be performed reliably, the free spaces and the fins are dimensioned such that they mesh with a certain amount of play. In addition, the fins and the free spaces are oriented so that they are oriented in the direction of the engagement movement of the parts.

In the present exemplary embodiment, the removal apparatus 111 is formed by a rotationally drivable rotational body with at least two carrier zones that are arranged at a distance from one another in the circumferential direction (and fixed in the circumferential direction) and extend over a length Y in the direction of rotation and which serve for receiving the segments 16 at the receiving station XA. The carrier zones are formed here by the receiving surfaces 123 of the receiving dogs 113. Between the carrier zones, free zones 124 are provided which extend over a length Z in the circumferential direction and which, in the present exemplary embodiment, are each formed by a recess extending radially inwards and thereby form a free space. The carrier zones are specifically designed to receive in each case one segment 16, while the free zones are not designed to receive segments 16 and merely form between the carrier zones deliberately unused intermediate zones which are important for realizing the different movement states of the removal apparatus 111 and for the reception and transfer of the segments 16. For this purpose, the carrier zones and the free zones 124 are arranged such that in a receiving phase at the receiving station XA the removal apparatus 111 passes the depositing element 112 with a free zone 124, during which a segment 16 is taken over by a carrier zone.

The free zones 124 are realized here by recesses. Alternatively, they can in general also be formed by passive surfaces of the rotational body which do not have vacuum lines and are therefore not designed to receive segments 16. The free zones are thus characterized by the fact that they do not carry any segments 16 and therefore do not deliver any segments 16 in the transfer station XB. It is therefore not necessary for the removal apparatus 111 to meet special movement conditions in the receiving phase in which it passes the transfer station XB with the free zones 124 and its movement behavior can be designed solely for receiving the segment 16 in the transfer station XA.

The carrier zones and the free zones 124 are arranged such that while a carrier zone is passing the receiving station XA, a free zone passes the transfer station XB, and while a carrier zone is aligned with the transfer station XB, a free zone is aligned with the receiving station XA. The free zones 124 can have a greater length Z in the circumferential direction of the rotational body than the carrier zones, so that the angles of rotation during which the free zones 124 pass the transfer station XB and the receiving station XA are greater than the angles of rotation during which the carrier zones pass the transfer station XB and the receiving station XA. As a result, the angles of rotation available for the acceleration and deceleration of the removal apparatus 111 are greater than the angles of rotation required for the reception and transfer of the segments 16. Due to the larger angles of rotation, the maximum acceleration and maximum deceleration for switching between the two prespecified speeds can be reduced. The free zone 124 here has a length Z spanning the receiving station XA and the transfer station XB.

The length Y of one or of each carrier zone can be less than, equal to or greater than the length Z of one or of each free zone 124. In addition, the lengths Z of the free zones 124 between the carrier zones can also be the same or different, whereby the advantages described above can be achieved. The length Y of one or of each carrier zone extending in the circumferential direction is greater than or equal to 20 mm, 50 mm, 60 mm, 90 mm or 100 mm. The length Y of one or of each carrier zone extending in the circumferential direction is less than or equal to 200 mm, 180 mm, 150 mm, 120 mm, 100 mm, 80 mm or 60 mm. The extension of one or of each carrier zone transverse to the length Y is greater than or equal to 40 mm, 50 mm, 60 mm, 80 mm, 90 mm, 100 mm, 150 mm, 180 mm or 300 mm. The extension of one or of each carrier zone transverse to the length Y is less than or equal to 400 mm, 350 mm, 300 mm, 250 mm, 200 mm, 150 mm, 130 mm, 120 mm, 110 mm, 100 mm, 90 mm, 80 mm, 50 mm or 40 mm.

Cylinders with a cylindrical lateral surface can be considered as rotational bodies, in which the carrier zones and the free zones 124 are formed by zones which are deliberately designed to carry or receive segments 16, while the free zones are not designed for this purpose and can also be referred to as passive zones. In addition, all bodies, which in the receiving station XA receive the segments 16 in a rotational movement, transport them onward to the transfer station XB by the rotational movement and deliver them there as described above, can also be considered as rotational bodies.

The rotational body can also be designed as a rotor with several rotor arms, whereby one or each rotor arm can have a receiving surface at its free ends. In addition, one or each rotor arm can be provided with vacuum channels which can open into the free ends of the rotor arms and in particular into the receiving surfaces arranged thereon. The rotor arms of the rotor are positioned fixedly relative to one another in the direction of the orbit of the rotor, in particular their distance from one another in the direction of the orbit is fixed, in particular their distance from one another in the direction of the orbit is unchangeable.

The discharge device 3 has a plurality of individually movable transport receptacles 119, which also have a support surface with identically designed fins 118 arranged parallel and equidistant from one another, the distances between which correspond at least to the width of the fins 118 of the receptacle 115. As a result, the receptacle 115 can, in the deposition position, dip with its fins 118 between the fins 118 of the transport receptacle 119 and deposit the stack on the support surface of the transport receptacle 119. The individually movable transport receptacles are used to transport the stacks away for further processing. Since the segments 16 and the stacks are checked during the preceding transport and/or stacking process for compliance with predetermined quality criteria by means of one or more sensor devices and are outwardly transferred from the production process if the quality criteria are not met, the stacking processes and the frequency of the stacks to be transported away from the receptacles 115 can vary. This change in the transport frequency of the stacks to be transported away can be taken into account by the individual mobility of the transport receptacles 119 in conjunction with a corresponding control system.

An important and independently inventive aspect of the present invention further consists in a sub-apparatus of or in a cell stacking system described above and a sub-method for producing cell stacks in a cell stacking system described above.

In this way, it is possible to process a high stream of segments 16, for example those cut on-line from a four-ply continuous web EG, immediately after they have been cut, whereby the cut segments 16 can as it were no longer be let go and can be continuously made available for stacking. In a certain sense, the segments 16 are no longer released, which makes it possible to maintain the position of the segments 16 and their orientation in a processing line/chain and to use them to control further subsequent processing units.

Re-alignment processes, such as those that are usually required when temporarily depositing segments 16, interrupting the material flow and then resuming it, can be reduced or even largely or completely eliminated. Alignment can be carried out very effectively by aligning the web from which the segments 16 are cut. If necessary, corrections to the positioning and/or alignment of the segments can also be carried out in the feed device, the conveyor unit F1 and/or the conveyor unit F2.

The supplied segments 16 of energy cells in a number A per unit of time are expediently divided into a number B per unit of time and a number C per unit of time. The number B per unit of time can, in a certain way, be advantageously transported further and, so to speak, guided through and removed from the number A, after which the number C is already significantly reduced compared to the number A. This makes the number C easier to stack in an orderly and precise manner without hindering the material flow. The number B is then also significantly reduced compared to the number A and is easier to stack in an orderly and precise manner. In a certain sense, a continuous, delay-free feed of divided partial streams to a cell stacking device 7 is made possible. If the cell stacking device 7 is equipped with corresponding entries for the partial streams, the stacking can be carried out in a certain sense in parallel, whereby high throughput rates can be achieved. A continuous web EG of uncut segments 16 can be supplied at high speed and the segments 16 cut therefrom can be further processed and stacked on-line. A heavy stream of segments 16 can be transported further reliably and effectively in an orderly manner, virtually without stopping or interruption, and can be advantageously divided into partial streams.

A stream of segments 16 with a number A per unit of time, cut on-line for example from a continuous web EG, can be divided, for example, in such a way that every second segment 16 is removed from the stream and a stream of segments 16 with the number B per unit of time is formed from the removed second segments 16 and a stream of segments 16 with the number C per unit of time is formed from the remaining segments 16. In the stream of segments 16 with the number B, the distance between two segments 16 can be greater than or approximately equal to the length of a segment 16. In the stream of segments 16 with the number C, the distance between two segments 16 can be greater than or approximately equal to the length of a segment 16. A distance formed in the stream of segments 16 with the number B between two consecutive segments 16 makes it possible in the case of further processing to provide a sequence of segments 16 in which the spacing and an associated time interval can be used for an access to a segment 16 during conveying of the stream of segments 16. For example, one or more removal apparatuses 111 of a cell stacking apparatus 11 can be given sufficient time in the time interval between the end of a first conveyed segment 16 and the beginning of a second conveyed segment 16 to be moved back into the receiving position, in particular from a dispensing or waiting position. The division process is somewhat similar to opening a zipper, in which in the closed state all elements abut each other with virtually no gap, and after opening have approximately the distance of one element between them.

However, it is advantageous for the invention if the segments 16, in contrast to the zipper comparison, in the stream with the number A per unit of time have a certain distance, in particular do not lie edge to edge or end to end. The division can also be imagined as follows: in the stream of segments 16 with the number A, the segments 16 of the stream with the number B and the segments 16 of the stream with the number C lie alternatingly one behind the other, for example "yellow" and "red" segments 16. In a dispensing region, for example G1, the stream of segments 16 of the number A is divided and the segments 16 of the stream of the number B and the segments 16 of the stream of the number C are transferred or allowed to pass corresponding to their alternating sequence. Taking up the color example again, a stream of "yellow" segments 16 with the number B per unit of time and a stream of "red" segments 16 with the number C would then be generated. For both streams "B" and "C," the segments 16 would in each case have a distance from each other that is greater than or approximately equal to the length of a segment 16. In this embodiment, the transportation speed of the streams of segments 16 with the number A per unit of time, the number B per unit of time and the number C per unit of time can be kept at least approximately the same. Advantageously, distances between the segments 16 in the streams "B" and "C" can be achieved in a simple manner without the need to change the position of the segments 16 in the streams "B" and/or "C," which ensures particularly gentle handling of the segments 16 and allows high throughput rates.

The dividing of the segment stream of the number A starting from the feed device 2 into the two partial streams with the numbers B and C makes possible an increase in the number A of supplied segments 16 per unit of time in the case of a prespecified and limited stacking capacity of a cell stacking apparatus 11, in that the number A of supplied segments 16 are stacked in two separate and parallel operating cell stacking apparatuses 11 at a correspondingly lower stacking rate.

If the conveying rate of the supplied segments 16, i.e. the number A, is to be further increased, the incoming stream of the segments 16 in the number A can be divided into further partial streams of the numbers D, E, F, etc. and then stacked in parallel in further cell stacking apparatuses 11. The basic idea of dividing the incoming stream of the segments 16 between several cell stacking apparatuses 11 thus makes possible a significantly higher conveying capacity of the segments 16 with a simultaneously positionally accurate stacking of the segments 16 in the cell stacking apparatuses 11, since the stacking speed in the sense of positionally accurate stacking can be designed to be correspondingly less than the feed rate of the segments 16 via the feed device 2.

Here the number B of segments 16 which are supplied in the first transfer region G1 to the second conveyor unit F2 is greater than the number C of segments 16 which are discharged in the second dispensing region G2. During the conveying process, the segments 16 are subjected to various quality checks and checks for the correct arrangement of the parts of the segments 16 in relation to one another, such as contact tabs, fastening apparatuses, etc., whereby if non-compliance with the quality specifications is detected, the segments 16 found to be "non-conforming" are outwardly transferred from the conveying process. This results in the number of segments 16 finally stacked being always slightly less than the number of segments 16 fed in. The segments 16 discharged in the second dispensing region G2 have already been fully checked, e.g. also by means of a sensor device arranged between the first dispensing region G1 and the second dispensing region G2, so that the number C of the segments 16 discharged are completely stacked without further segments 16 being outwardly transferred. However, the segments 16 transferred in the second dispensing region G2 subsequently run along a further transport path, so that they can still slip slightly or be influenced in some other way, so that further checks and associated outward transfers of the segments 16 may subsequently be necessary. It is therefore sensible to make the number B of segments 16 transferred to the second conveyor unit F2 in the first dispensing region G1 larger than the number C of segments 16 discharged in the second dispensing region G2.

Figure 1:
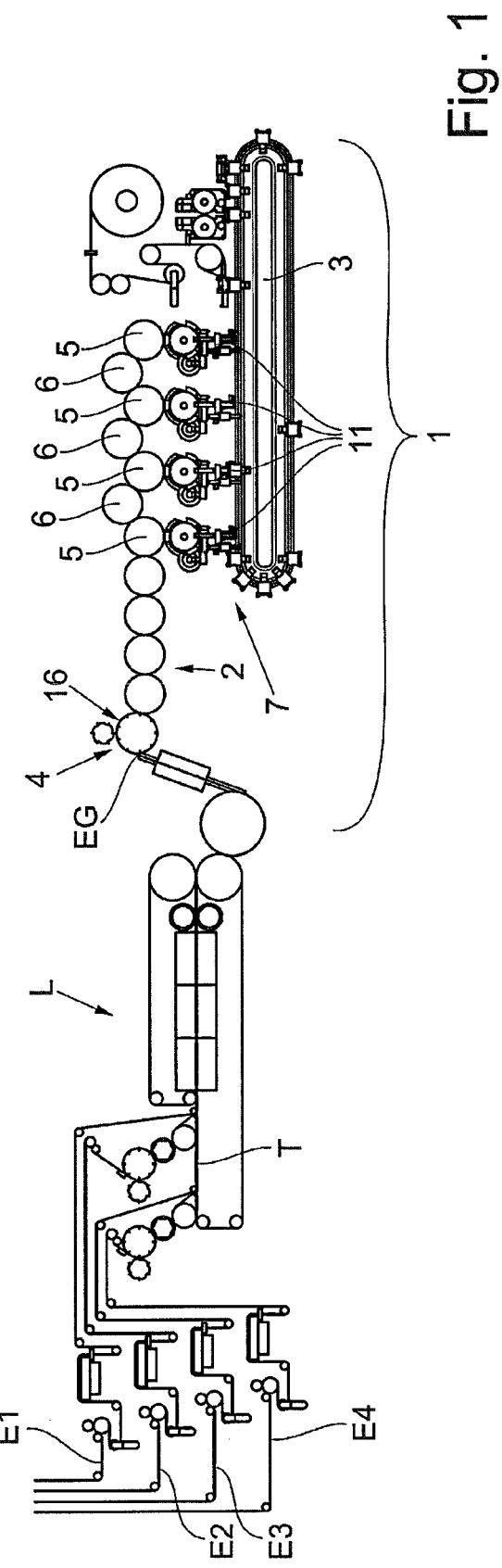
FIG. 1: shows a production machine with a cell stacking
system according to the invention.

In addition, it is advantageous if the number B of the segments corresponds to a multiple of the number C. In this case, a structurally simple structure with a correspondingly simple stacking can be achieved by providing a plurality of identical cell stacking apparatuses 11. In the present case, four cell stacking apparatuses 11 are provided, as can be seen in FIG. 1, so that the number B of the segments 16 transferred in the first dispensing region G1 corresponds to three times the number C of the segments 16 transferred in the second dispensing region G2. The production machine shown in FIG. 1 can be operated by the proposed sub-apparatus and/or the proposed sub-method at a high conveying rate of the segments 16 in the feed device 2 and a simultaneous positionally accurate stacking of the segments

16 in the cell stacking apparatuses 11, since due to the solution according to the invention the stacking rate of the segments 16 in the cell stacking apparatuses 11 is considerably less than the feed rate of the segments 16 in the feed device 2. If the feed rate of the segments 16 in the feed device 2 corresponds to the number A, e.g. 400 segments 16 per unit of time, e.g. per minute, the number C in this case would be 100 segments per minute and the number B would be 300 segments per minute. The reduction in segments 16 due to outward transfers on account of quality defects is not taken into account here.

The proposed sub-apparatus can be further improved as desired with the features of the proposed cell stacking system 1, wherein the parallel arrangement of the cell stacking apparatuses 11 and their assignment to the four transfer cylinders 5 is particularly important, since this enables a positionally accurate stacking of the product streams of the segments 16 divided by the sub-apparatus. In the same way, the proposed sub-method can also be further improved by combining it with the features of the proposed method for controlling a cell stacking system 1, since the proposed method contains essential suggestions as to how the cell stacking system 1 can be better controlled for stacking the partial streams formed by the sub-method.

LIST OF REFERENCE SIGNS

1 Cell stacking system
2 Feed device
3 Discharge device
4 Cutting device
5 Transfer cylinder
6 Reversing cylinder
7 Cell stacking device
11 Cell stacking apparatus
16 Segment
111 Removal apparatus
112 Depositing element
113 Receiving dog
114 Transfer device
115 Receptacle
116 Lifting device
117 Depositing lever
118 Fins
119 Transport receptacle
120 Vacuum line
121 Vacuum supply
122 Vacuum line
123 Receiving surface
124 Free space
A, B, C, D, E, F Number
E1-E4 Continuous webs
EG Four-ply continuous web
F1 First conveyor unit
F2 Second conveyor unit
G1 First dispensing region
G2 Second dispensing region
XA Receiving station
XB Transfer station

The invention claimed is:

1. A cell stacking system for stacking segments of energy cells, comprising:
   a feed device which continuously feeds the segments at a feed speed, and
   a discharge device which discharges the segments in stacks, at least one cell stacking apparatus which receives the segments from the feed device and transfers the segments in stacked form to the discharge device,
wherein
the cell stacking apparatus has at least one removal apparatus and one depositing element, and
the depositing element comprises a transfer device, a depositing lever and a receptacle which can be moved from a receiving position to a dispensing position and vice versa, wherein
the depositing lever removes the segments from the removal apparatus and places them in the receptacle arranged in the receiving position, and
the transfer device is movable from a ready position into a holding position, and wherein
the transfer device is arranged in the holding position during the movement of the receptacle from the receiving position into the dispensing position and forms an intermediate support for depositing the segments;
wherein,
the removal apparatus is formed by a rotatably driven cylinder;
wherein
the cylinder comprises at least one receiving dog for receiving the segments and from which the depositing lever removes the segments; and
wherein
each receiving dog has a receiving surface in the form of a circular arc section in the cross section of the cylinder, and
the receiving surface of each receiving dog is arranged on the same diameter in cross section.

2. The cell stacking system according to claim 1, wherein the cylinder comprises at least three receiving dogs arranged at identical angles to one another for receiving the segments and from which the depositing lever removes the segments.

3. The cell stacking system according to claim 1, wherein the removal apparatus can be periodically decelerated and accelerated during the feeding of the segments.

4. The cell stacking system according to claim 1, wherein the depositing element has a linearly movable receptacle which feeds the stacks in the direction of a surface normal of the segments on the discharge device.

5. The cell stacking system according to claim 4, wherein the depositing element has a lifting device which, when activated, moves the receptacle via a linear guidance device.

6. The cell stacking system according to claim 5, wherein at least one sensor device, which detects a property of the stack or of the receptacle, is provided in the region of the lifting device.

7. The cell stacking system according to claim 5, wherein the lifting device moves the receptacle, after the deposition of a segment, away from the removal apparatus by a distance which corresponds to the thickness of the deposited segment plus a prespecified additional distance.

8. The cell stacking system according to claim 4, wherein the receptacle and the transfer device each have a support surface which is formed by the surfaces of a plurality of fins arranged parallel and equidistant from one another, and
the transfer device and the receptacle engage with each other with their fins during their movements for transferring the stacks of segments.

9. The cell stacking system according to claim 1, wherein a discharge device with a plurality of individually movable transport receptacles is provided, into which the depositing element deposits the stacks.

10. The cell stacking system according to claim 1, wherein the removal apparatus and/or the receptacle of the depositing element have one or more vacuum lines which can be subjected to negative pressure and which, by the application of negative pressure, support the reception of the segments from the feed device by the removal apparatus, and/or from the removal apparatus by the depositing element, and the transportation on the removal apparatus.

11. The cell stacking system according to claim 1, wherein the depositing lever is driven by a drive device to perform a periodic discharge movement from the removal apparatus.

12. The cell stacking system according to claim 11, wherein the discharge movement is formed by a linear lifting movement.

13. The cell stacking system according to claim 11, wherein the depositing lever during the deposition of the segments in the receptacle executes an identical stroke or a stroke increasing by a prespecified additional distance.

14. The cell stacking system according to claim 11, wherein the depositing lever during deposition of the segments onto the transfer device arranged in the holding position executes a stroke which decreases by at least the thickness of the segments.

15. A cell stacking system for stacking segments of energy cells, comprising:
a feed device which continuously feeds the segments at a feed speed, and
a discharge device which discharges the segments in stacks,
at least one cell stacking apparatus which receives the segments from the feed device and transfers the segments in stacked form to the discharge device,
wherein
the cell stacking apparatus has at least one removal apparatus and one depositing element, and
the depositing element comprises a transfer device, a depositing lever and a receptacle which can be moved from a receiving position to a dispensing position and vice versa, wherein
the depositing lever removes the segments from the removal apparatus and places them in the receptacle arranged in the receiving position, and
the transfer device is movable from a ready position into a holding position, and wherein
the transfer device is arranged in the holding position during the movement of the receptacle from the receiving position into the dispensing position and forms an intermediate support for depositing the segments; and
wherein
a discharge device with a plurality of individually movable transport receptacles is provided, into which the depositing element deposits the stacks.

16. The cell stacking system according to claim 15, wherein the removal apparatus is formed by a rotatably driven cylinder.

17. The cell stacking system according to claim 16, wherein the receiving dogs each have a receiving surface in the form of a circular arc section in the cross section of the cylinder, and the receiving surfaces of the receiving dogs are arranged on the same diameter in cross section.

18. The cell stacking system according to claim 15, wherein the removal apparatus can be periodically decelerated and accelerated during the feeding of the segments.

19. The cell stacking system according to claim 15, wherein the depositing element has a linearly movable receptacle which feeds the stacks in the direction of a surface normal of the segments on the discharge device.

20. The cell stacking system according to claim 19 wherein the depositing element has a lifting device which, when activated, moves the receptacle via a linear guidance device.

21. The cell stacking system according to claim 20, wherein at least one sensor device, which detects a property of the stack or of the receptacle, is provided in the region of the lifting device.

22. The cell stacking system according to claim 20, wherein the lifting device moves the receptacle, after the deposition of a segment, away from the removal apparatus by a distance which corresponds to the thickness of the deposited segment plus a prespecified additional distance.

23. The cell stacking system according to claim 21, wherein the receptacle and the transfer device each have a support surface which is formed by the surfaces of a plurality of fins arranged parallel and equidistant from one another, and the transfer device and the receptacle engage with each other with their fins during their movements for transferring the stacks of segments.

24. The cell stacking system according to claim 15, wherein a discharge device with a plurality of individually movable transport receptacles is provided, into which the depositing element deposits the stacks.

25. A cell stacking system for stacking segments of energy cells, comprising:

a feed device which continuously feeds the segments at a feed speed, and a discharge device which discharges the segments in stacks, at least one cell stacking apparatus which receives the segments from the feed device and transfers the segments in stacked form to the discharge device, wherein the cell stacking apparatus has at least one removal apparatus and one depositing element, and the depositing element comprises a transfer device, a depositing lever and a receptacle which can be moved from a receiving position to a dispensing position and vice versa, wherein the depositing lever removes the segments from the removal apparatus and places them in the receptacle arranged in the receiving position, and the transfer device is movable from a ready position into a holding position, and wherein the transfer device is arranged in the holding position during the movement of the receptacle from the receiving position into the dispensing position and forms an intermediate support for depositing the segments; and wherein the removal apparatus and/or the receptacle of the depositing element have one or more vacuum lines which can be subjected to negative pressure and which, by the application of negative pressure, support the reception of the segments from the feed device by the removal apparatus, and/or from the removal apparatus by the depositing element, and the transportation on the removal apparatus.

26. The cell stacking system according to claim 25, wherein the removal apparatus is formed by a rotatably driven cylinder.

27. The cell stacking system according to claim 25, wherein the removal apparatus can be periodically decelerated and accelerated during the feeding of the segments.

28. The cell stacking system according to claim 25, wherein a discharge device with a plurality of individually movable transport receptacles is provided, into which the depositing element deposits the stacks.

* * * * *